(12) United States Patent
Ebrahimi Afrouzi et al.

(10) Patent No.: US 11,393,114 B1
(45) Date of Patent: *Jul. 19, 2022

(54) METHOD AND SYSTEM FOR COLLABORATIVE CONSTRUCTION OF A MAP

(71) Applicants: Ali Ebrahimi Afrouzi, San Jose, CA (US); Sebastian Schweigert, Oakland, CA (US); Lukas Fath, Etobiocke (CA); Chen Zhang, Dublin, CA (US)

(72) Inventors: Ali Ebrahimi Afrouzi, San Jose, CA (US); Sebastian Schweigert, Oakland, CA (US); Lukas Fath, Etobiocke (CA); Chen Zhang, Dublin, CA (US)

(73) Assignee: AI Incorporated, Toronto (CA)

( * ) Notice: Subject to any disclaimer, the term of this patent is extended or adjusted under 35 U.S.C. 154(b) by 541 days.

This patent is subject to a terminal disclaimer.

(21) Appl. No.: 16/185,000

(22) Filed: Nov. 8, 2018

Related U.S. Application Data

(60) Provisional application No. 62/746,688, filed on Oct. 17, 2018, provisional application No. 62/740,558, (Continued)

(51) Int. Cl.
*G06T 7/55* (2017.01)
*G06F 16/29* (2019.01)
(Continued)

(52) U.S. Cl.
CPC .............. *G06T 7/55* (2017.01); *G06F 16/29* (2019.01); *G06T 7/13* (2017.01); *G06T 7/174* (2017.01);
(Continued)

(58) Field of Classification Search
None
See application file for complete search history.

(56) References Cited

U.S. PATENT DOCUMENTS 5,896,488 A   4/1999   Jeong
6,667,592 B2  12/2003  Jacobs et al.
(Continued)

OTHER PUBLICATIONS

Yamabe et al., "Quantized Feature with Angular Displacement for Activity Recognition", Electronics and Communications in Japan, vol. 99, No. 9, 2016, Wiley Periodicals, Inc. (Year: 2016).*
(Continued)

*Primary Examiner* — Christian Chace
*Assistant Examiner* — Amelia Vorce

(57) ABSTRACT

Methods and systems for collaboratively constructing a map of an environment. One or more sensory devices installed on an autonomous vehicle take readings within a field of view of the sensory device. As the vehicle moves within the environment, the sensory device continuously takes readings within new fields of view. At the same time, sensory devices installed on other autonomous vehicles operating within the same environment and/or fixed devices monitoring the environment take readings within their respective fields of view. The readings recorded by a processor of each autonomous vehicle may be shared with all other processors of autonomous vehicles operating within the same environment with whom a data transfer channel is established. Processors combine overlapping readings to construct continuously growing segments of the map. Combined readings are taken by the same sensory device or by different sensory devices and are taken at the same time or at different times.

22 Claims, 5 Drawing Sheets

Related U.S. Application Data filed on Oct. 3, 2018, provisional application No. 62/740,580, filed on Oct. 3, 2018, provisional application No. 62/740,573, filed on Oct. 3, 2018, provisional application No. 62/688,497, filed on Jun. 22, 2018, provisional application No. 62/674,173, filed on May 21, 2018, provisional application No. 62/667,977, filed on May 7, 2018, provisional application No. 62/666,266, filed on May 3, 2018, provisional application No. 62/665,095, filed on May 1, 2018, provisional application No. 62/661,802, filed on Apr. 24, 2018, provisional application No. 62/658,705, filed on Apr. 17, 2018, provisional application No. 62/655,494, filed on Apr. 10, 2018, provisional application No. 62/648,026, filed on Mar. 26, 2018, provisional application No. 62/640,444, filed on Mar. 8, 2018, provisional application No. 62/637,156, filed on Mar. 1, 2018, provisional application No. 62/637,185, filed on Mar. 1, 2018, provisional application No. 62/631,050, filed on Feb. 15, 2018, provisional application No. 62/624,891, filed on Feb. 1, 2018, provisional application No. 62/616,928, filed on Jan. 12, 2018, provisional application No. 62/614,449, filed on Jan. 7, 2018, provisional application No. 62/613,157, filed on Jan. 3, 2018, provisional application No. 62/613,005, filed on Jan. 2, 2018, provisional application No. 62/599,216, filed on Dec. 15, 2017, provisional application No. 62/591,217, filed on Nov. 28, 2017, provisional application No. 62/590,205, filed on Nov. 22, 2017, provisional application No. 62/583,070, filed on Nov. 8, 2017.

(51) Int. Cl.
*G06T 7/70* (2017.01)
*G06T 7/13* (2017.01)
*G06T 7/174* (2017.01)
*G01S 1/00* (2006.01)

(52) U.S. Cl.
CPC ...... *G06T 7/70* (2017.01); *G06T 2207/10028* (2013.01); *G06T 2207/20221* (2013.01)

(56) References Cited

U.S. PATENT DOCUMENTS

| | | | |
|---|---|---|---|
| 8,170,372 B2 * | 5/2012 | Kennedy | G06K 9/00 382/291 |
| 8,961,695 B2 | 2/2015 | Romanov et al. | |
| 8,996,292 B2 | 3/2015 | Park et al. | |
| 9,102,055 B1 | 8/2015 | Konolige et al. | |
| 9,725,012 B2 | 8/2017 | Romanov et al. | |
| 10,008,027 B1 * | 6/2018 | Baker | G06T 7/50 |
| 10,410,328 B1 * | 9/2019 | Liu | H04N 5/23229 |
| 10,445,896 B1 * | 10/2019 | Bills | G06T 11/40 |
| 10,554,881 B2 * | 2/2020 | Price | G06K 7/10633 |
| 10,728,520 B2 * | 7/2020 | Kamal | G01B 11/00 |
| 2003/0030398 A1 | 2/2003 | Jacobs et al. | |
| 2003/0229421 A1 | 12/2003 | Chmura et al. | |
| 2004/0168148 A1 | 8/2004 | Goncalves et al. | |
| 2005/0182518 A1 | 8/2005 | Karlsson | |
| 2006/0027404 A1 | 2/2006 | Foxlin | |
| 2007/0146232 A1 | 6/2007 | Redert et al. | |
| 2007/0271011 A1 | 11/2007 | Lee et al. | |
| 2007/0293985 A1 | 12/2007 | Myeong et al. | |
| 2010/0094460 A1 | 4/2010 | Choi et al. | |
| 2011/0098923 A1 | 4/2011 | Lee | |
| 2011/0178709 A1 | 7/2011 | Park et al. | |
| 2012/0056982 A1 * | 3/2012 | Katz | G06T 7/521 348/43 |
| 2012/0170057 A1 * | 7/2012 | Kereth | G01S 7/4811 356/614 |
| 2013/0278755 A1 * | 10/2013 | Starns | G06T 7/593 348/135 |
| 2014/0253679 A1 * | 9/2014 | Guigues | H04N 13/128 348/42 |
| 2014/0350839 A1 | 11/2014 | Pack et al. | |
| 2015/0109415 A1 * | 4/2015 | Son | G06T 7/55 348/46 |
| 2015/0206318 A1 * | 7/2015 | Parfenov | G06T 5/50 382/154 |
| 2015/0362921 A1 * | 12/2015 | Hanaoka | G05D 1/0274 701/23 |
| 2016/0012633 A1 * | 1/2016 | Wei | G06T 7/593 345/420 |
| 2016/0289042 A1 * | 10/2016 | Fang | G06T 7/10 |
| 2016/0321809 A1 * | 11/2016 | Chukka | G16H 30/20 |
| 2017/0032220 A1 * | 2/2017 | Medasani | G06K 9/6215 |
| 2017/0169604 A1 * | 6/2017 | Van Der Zwan | G06T 7/62 |
| 2017/0225678 A1 * | 8/2017 | Bariant | B60W 30/14 |
| 2017/0261595 A1 * | 9/2017 | Wu | G01C 21/206 |
| 2017/0322048 A1 * | 11/2017 | Yoshida | H04N 13/254 |
| 2018/0027224 A1 * | 1/2018 | Javidnia | H04N 13/128 382/154 |
| 2018/0091798 A1 * | 3/2018 | Chang | H04N 13/271 |
| 2018/0218214 A1 * | 8/2018 | Pestun | G06K 9/00651 |
| 2018/0307310 A1 * | 10/2018 | McCombe | G06T 11/00 |
| 2018/0344114 A1 * | 12/2018 | Scholten | A47L 9/2894 |
| 2018/0365837 A1 * | 12/2018 | Fukuoka | G06T 7/13 |
| 2019/0236796 A1 * | 8/2019 | Blasco Claret | G06T 7/155 |
| 2020/0226119 A1 * | 7/2020 | Naruse | G06F 3/04815 |

OTHER PUBLICATIONS

Ioannis Kostavelis et al., Stereo-Based Visual Odometry for Autonomous Robot Navigation, International Journal of Advanced Robotic Systems, 2016, vol. 13-1, SAGE Publications.

Jaeheon Jeong, A Divide-and-Conquer Approach for Visual Odometry with Minimally-Overlapped Multi-Camera Setup, Computer Science Graduate Theses & Dissertations, 2014, pp. 1-95, University of Colorado, Colorado, USA.

Peter Corke, The Image Jacobian, Queensland University of Technology Robot Academy. Available from: https://robotacademy.net.au/lesson/the-image-jacobian/.

L Pari, Image Based Visual Servoing: Estimated Image Jacobian by Using Fundamental Matrix VS Analytic Jacobian, Image Analysis and Recognition, 2008, pp. 706-717, vol. 5112, Springer, Berlin, Germany.

* cited by examiner

METHOD AND SYSTEM FOR COLLABORATIVE CONSTRUCTION OF A MAP

CROSS-REFERENCE TO RELATED APPLICATIONS

This application claims the benefit of Provisional Patent Application No. 62/583,070, filed on Nov. 8, 2017; 62/637,156, filed Mar. 1, 2018; 62/637,185, filed Mar. 1, 2018; 62/613,005, filed Jan. 2, 2018; 62/599,216, filed Dec. 15, 2017; 62/740,558, filed Oct. 3, 2018; 62/591,217, filed Nov. 28, 2017; 62/616,928, filed Jan. 12, 2018; 62/613,005, filed Jan. 2, 2018; 62/614,449, filed Jan. 7, 2018; 62/590,205, filed Nov. 22, 2017; 62/666,266, filed May 3, 2018; U.S. Pat. No. 62,661,802, filed Apr. 24, 2018; 62/631,050, filed Feb. 15, 2018; 62/746,688, filed Oct. 17, 2018; 62/740,573, filed Oct. 3, 2018; 62/740,580, filed Oct. 3, 2018; 62/640,444, filed Mar. 8, 2018; 62/648,026, filed Mar. 26, 2018; 62/655,494, filed Apr. 10, 2018; 62/665,095, filed May 1, 2018; 62/674,173, filed May 21, 2018; 62/658,705, filed Apr. 17, 2018; 62/667,977, filed May 7, 2018; 62/624,891, filed Feb. 1, 2018; 62/613,157, filed Feb. 15, 2018; 62/688,497, filed Jun. 22, 2018, each of which is hereby incorporated herein by reference.

In this patent, certain U.S. patents, U.S. patent applications, or other materials (e.g., articles) have been incorporated by reference. Specifically, U.S. patent application Ser. No. 15/243,783 (now U.S. Pat. No. 9,972,098), Ser. Nos. 15/224,442, 15/674,310, 15/683,255, 15/954,335, 15/954,410, 15/257,798, 15/949,708, 16/109,617, 16/048,185, 16/048,179, 15/614,284, 15/272,752, 16/163,541, 16/163,562, 16/163,508, 15/981,643, 15/986,670, 15/048,827, 15/406,890, 15/425,130, 15/955,344, 15/955,480, 16/051,328, 15/449,660, 14/817,952, 14/673,633, 16/041,286, 62/590,205, 62/666,266, 62/613,005, and 62/616,928 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present disclosure relates to maps, and more particularly, to the combination of depth data from multiple networked sources for the construction of a map of an environment for autonomous or semi-autonomous vehicles, such as automobiles and/or robotic devices.

BACKGROUND

For autonomous or semi-autonomous automobiles to operate autonomously or with minimal input and/or external control within an environment, mapping methods are implemented within the automobile to create a map of the environment that can be for navigation and/or operation within the environment. Similarly, autonomous or semi-autonomous robotic devices rely on maps of their environment to navigate and execute tasks, such as transporting goods to a specific location, cleaning a specific area, patrolling certain areas of an environment, etc. In some cases autonomous or semi-autonomous vehicles, such as automobiles and robotic devices, use a map comprising a 360-degree field of view of the environment that only reaches to the closest obstacles in their immediate surroundings to navigate throughout the environment. For example, an autonomous robotic device uses a map of its immediate surroundings as it operates to navigate from a source to a destination and to avoid obstacles while travelling to the destination. While a map of the immediate surroundings is adequate for navigation and obstacle avoidance, a map of the environment which extends beyond the immediate surroundings of the autonomous or semi-autonomous vehicle can further optimize its performance. For example, an autonomous automobile entering a parking lot limited to observing a 360-degrees field of view extending to a first set of obstacles is restricted to its observation of the parking lot area and a parking spot available and located in a blind spot of the autonomous automobile is left unnoticed as the autonomous automobile has no way of observing the area beyond its immediate field of view in which the parking spot is located. With an extended field of view all open parking spaces are observable. In a further example, an autonomous cleaning robotic device performing work in an airport only capable of discovering its immediate working area and the area where its charging station is located has no ability of finding a charging station closer to its location than its own charging station when charging is required. In yet another example, an autonomous robotic device with a 360-degrees LIDAR performing work in a warehouse is restricted to observing the isle within which the robot is located. Due to this restriction, it has no method of knowing how to travel to the other side of the warehouse without traveling to those areas and discovering them itself. In these instances, an extended map of the environment can improve efficiency of the autonomous vehicle as it operates.

None of the preceding discussion should be taken as a disclaimer of any of the described techniques, as the present approach may be used in combination with these other techniques in some embodiments.

SUMMARY

The following presents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented below.

Some aspects include a method for perceiving a spatial model of a working environment including capturing data by one or more sensors of one or more vehicles moving within the working environment, the data being indicative of depth within the working environment from respective sensors of the one or more vehicles to objects in the working environment at a plurality of different sensor poses; obtaining, with one or more processors of at least one of the one or more vehicles moving within the working environment, a plurality of depth images based on the captured data, wherein: respective depth images are based on data captured from different positions of the one or more sensors within the working environment through which the one or more vehicles move, respective depth images comprise a plurality of depth data, the depth data indicating distance from respective sensors to objects within the working environment at respective sensor poses, and depth data of respective depth images correspond to respective fields of view of the one or more sensors of the one or more vehicles; aligning, with the one or more processors of the at least one of the one or more vehicles moving within the working environment, depth data of respective depth images based on one or more areas of overlap between the fields of view of the plurality of depth images; and determining, with one or more processors of the at least one of the one or more vehicles moving within the working environment, based on alignment of the depth data, the spatial model of the working environment.

Some aspects include a plurality of vehicles, each including an actuator configured to move the respective vehicle through a working environment; one or more mechanically coupled sensors; one or more processors configured to send and receive sensed data from the one or more sensors of the plurality of vehicles and control the respective vehicle's actuator; and memory storing instructions that when executed by at least some of the processors of each vehicle effectuate operations comprising: capturing data by the one or more sensors of the respective vehicle moving within the working environment, the data being indicative of depth within the working environment from respective sensors of the vehicle to objects in the working environment at a plurality of different sensor poses; obtaining a plurality of depth images based on the data captured by the one or more sensors of the plurality of vehicles moving within the environment, wherein: respective depth images are based on data captured from different positions within the working environment through which each of the plurality of vehicles moves, respective depth images comprise a plurality of depth data, the depth data indicating distance from respective sensors to objects within the working environment at respective sensor poses, and depth data of respective depth images correspond to respective fields of view; aligning depth data of respective depth images based on one or more areas of overlap between the fields of view of the plurality of depth images; and determining, based on alignment of the depth data, a spatial model of the working environment.

Some aspects include a method for constructing a floor plan using a plurality of cameras configured to move within a working environment, the method including perceiving depths from one or more of the plurality of cameras to objects within a respective field of view, such that a depth is recorded for specified angles within each of the one or more respective fields of view; obtaining, with one or more processors of one or more of the plurality of cameras, at least a portion of the depths perceived by the one or more plurality of cameras; comparing, with the one or more processors of the one or more of the plurality of cameras, at least a portion of depths perceived by the one or more plurality of cameras; identifying, with the one or more processors of the one or more of the plurality of cameras, one or more areas of overlap between the depths perceived by the one or more plurality of cameras when a number of consecutive depths from different fields of view are similar to a specified tolerance range; and combining depths from the different fields of view at the identified area of overlap to generate combined fields of view.

Some aspects include a plurality of robots configured to execute the above-described methods.

BRIEF DESCRIPTION OF DRAWINGS

The present techniques are described with reference to the following figures.

DETAILED DESCRIPTION OF CERTAIN EMBODIMENTS

Figure 1A:
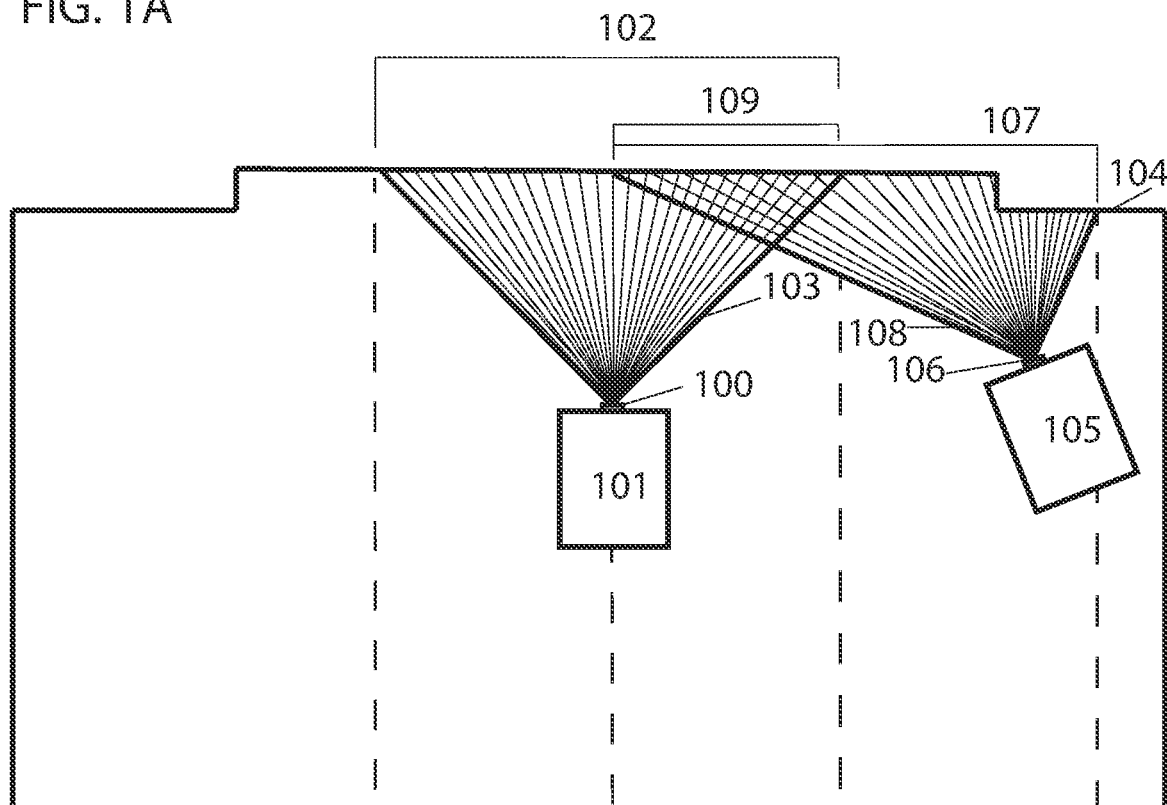
FIG. 1A illustrates two depth measurement devices taking depth readings within their respective fields of view, as provided in some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some of the embodiments described herein provide processes and systems for collaborative construction of a map, floor plan, spatial model, or other topographical representation of an environment using data collected by sensing devices, such as cameras, depth measurement devices, LIDARs, sonars, or other sensing devices, mounted on autonomous or semi-autonomous vehicles, such as automobiles and robotic devices, operating within the environment and/or fixed sensing devices monitoring the environment. Other types of depth sensing devices, such as at least one IR illuminator combined with at least one imaging device and an image processor, can used to measure depth to objects in the environment. Examples of such depth sensing devices are described in U.S. patent application Ser. Nos. 15/243,783, 15/954,335, 15/954,410, 15/257,798, 15/224,442, and 15/683,255, the entire contents of which are hereby incorporated by reference. Cameras such as depth cameras, stereo vision cameras, and digital cameras can also be used. In some embodiments, at least one depth measurement device and at least one camera are installed on, for example, an autonomous vehicle. A vehicle in this context can be thought of as any non-living mode of transportation. Examples of vehicles include automobiles, robotic devices, all-terrain vehicles, planetary vehicles, carts, hovercraft, drone, etc. The depth measurement device takes depth readings from the depth measurement device to objects within its field of view while the camera captures visual readings within its field of view. As the autonomous vehicle moves within the environment, the depth measurement device takes depth readings from the depth measurement device to objects within its field of view while the camera captures visual readings of the environment within its field of view. In some embodiments, the line of sight of the at least one camera is parallel to the plane on which the autonomous vehicle moves and in other embodiments, the line of sight of the camera is at an angle to the plane on which the autonomous vehicle moves. In some embodiments, the depth measurement device takes depth readings within a 360-degree field of view of a two-dimensional plane. In other embodiments, the depth measurement device takes depth readings within a limited field of view of a two-dimensional plane, such as a 90-degree or 180-degree field of view. In some embodiments, the depth measurement device takes depth readings in three-dimension. At the same time, depth measurement devices and cameras installed on, for example, other autonomous vehicles operating within the same environment, take depth readings and capture visual readings within their respective fields of view. A processor of each autonomous vehicle shares depth readings and visual readings taken by their respective at least one depth measurement device and at least one camera, respectively, with all or a select group of other autonomous vehicles operating within the same environment with whom a wireless data transfer channel (DTC) is established. Processors of fixed sensing devices monitoring the environment and sensory devices that have previously operated within the same environment also share their readings. In some instances, a processor of an autonomous vehicle shares data from a previously constructed map of the environment. If applicable, as in the case of depth readings, for example, the processor of an autonomous vehicle adjusts data received from another processor of an autonomous vehicles based on its location with respect to the location of the autonomous vehicle sending the data. In some embodiments, sensors mounted on autonomous vehicles rotate (or otherwise scan, e.g., horizontally and vertically) independently of the vehicle. In such cases, the processor of the autonomous vehicle receiving the depth readings uses the position of its mounted sensor in relation to the position of the mounted sensor of the autonomous vehicle sending the depth readings to adjust the depth readings received.

To form a larger field of view, the sensory devices of each autonomous vehicle collects readings and its processor stores the readings and uses them to create a larger field of view map by combining overlapping readings taken within separate fields of view, using overlapping readings as attachment points. The processor of an autonomous vehicle can identify overlap in multiple ways. In some embodiments, the readings from a first field of view are compared with readings from a second field of view. An area of overlap between the two fields of view is identified (e.g., determined) when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, are identified (e.g., determined to correspond based on similarity of the values). For example, if a sonar and laser distance sensor produce similar outputs to within a tolerance range, the processor infers that the distances measured were to the same obstacles within the environment and combines the two sets of readings using the similar readings as connecting points. In some embodiments, the processor identifies overlap by recognizing similar patterns between two sets of readings. For example, if the processor identifies the same sequence of pixel values in two images, the processor infers that both images captured the same location within the environment and combines them at overlapping points. In some embodiments, the processor identifies patterns by taking the rate of change of readings for both sets of data and comparing them to find similar patterns in the rate of change. For example, if the processor compares the color depth of two images and they are both observed to have the greatest rates of change in similar locations, the processor hypothesizes that the two images have overlapping data points. In another example, the processor identifies the area of overlap between two sets of readings by detecting a sudden increase then decrease in the values of two sets of readings. Examples include applying an edge detection algorithm (like Haar or Canny) to readings from the different fields of view and aligning edges in the resulting transformed outputs. Other patterns, such as increasing values followed by constant values or constant values followed by decreasing values or any other pattern in the values of the readings, can also be used to estimate the area of overlap. In some embodiments, a Jacobian and Hessian matrix can be used to identify such similarities. In other embodiments, the processor identifies overlap through the detection of similar features found in both sets of readings. For example, if the processor detects a unique sign in two images the processor infers that both images were taken at the same place and overlap. In some embodiments, where images of the environment are captured, the processor stitches images together at overlapping features or pixels of a pixmap of the images. In some embodiments, the processor uses features such as edges, circles, curves, lines or other shapes to identify overlap between images. For example, a sign captured in an image from two different perspectives contains enough overlapping features to combine the two images and create a 3D field of view. In some embodiments, the processor uses a convoluted neural network to identify certain features in an image and connecting points between multiple images. This is particularly useful when, for example, images are captured from different distances causing the environment to appear differently in each of the images captured. In some embodiments, the processor uses thresholding to identify the area of overlap between two sets of readings wherein areas or objects of interest within an image are identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, the processor uses a metric, such as the Szymkiewicz-Simpson coefficient, to indicate how good of an overlap there is between two sets of readings.

Or some embodiments determine an overlap with a convolution. Some embodiments implement a kernel function that determines an aggregate measure of differences (e.g., a root mean square value) between some or all of a collection of adjacent readings in one image relative to a portion of the other image to which the kernel function is applied. Some embodiments then determine the convolution of this kernel function over the other image, e.g., in some cases with a stride of greater than one pixel value. Some embodiments then select a minimum value of the convolution as an area of identified overlap that aligns the portion of the image from which the kernel function was formed with the image to which the convolution was applied.

In some embodiments, the processor identifies overlap using several different methods to increase the probability of a hypothesized overlap. In some embodiments, the processor uses each additional overlapping set of data to qualify or disqualify the hypothesized overlap between two sets of data.

In some embodiments, wherein the processor uses images to construct a map of the environment, the processor preprocesses images before determining overlap. For instance, some embodiments infer an amount of displacement of an autonomous vehicle between images, e.g., by integrating readings from an inertial measurement unit or odometer (in some cases after applying a Kalman filter), and then transform the origin for vectors in one image to match an origin for vectors in the other image based on the measured displacement, e.g., by subtracting a displacement vector from each vector in the subsequent image. Further, some embodiments down-res images to afford faster matching, e.g., by selecting every other, every fifth, or more or fewer vectors, or by averaging adjacent readings to form two lower-resolution versions of the images to be aligned. The processor then applies the resulting alignment to the two higher resolution images.

In some embodiments, the processor expands the area of overlap to include a number of readings immediately before and after (or spatially adjacent) the readings within the identified overlapping area. Once an area of overlap is identified (e.g., as a bounding box of pixel positions or threshold angle of a vertical plane at which overlap starts in each field of view).

When the processor of each autonomous vehicle receives new readings from a remote source (i.e. another autonomous vehicle and/or fixed sensing device monitoring the environment), it stores those readings in a memory of the autonomous vehicle and checks if the received readings overlap with readings in its map. The processor uses similar methods for identifying overlap between readings from a remote source and a local source or two sets of readings from two remote sources as those described above for identifying overlap between two sets of local readings. In some embodiments, the confidence level of the readings from a local source have higher confidence level than readings received from remote sources or vice versa. In some embodiments, the processor assigns readings from different sources different confidence levels. To check for overlap, the processor considers multiple variations of combinations, each having different overlap, in order to filter through the data, determine if and where there is overlap, and if so, the combination which results in readings with the highest confidence level. If the processor identifies a combination which results in readings with higher confidence level, the processor implements the combination into the map, otherwise the processor stores the received readings for future combinations. For example, if the processor of an autonomous vehicle receives a set of readings from a remote source which has a number of consecutive readings with values similar to the same number of consecutive readings within the map of the autonomous vehicle, the processor combines the readings and if their combination results in readings with a higher confidence level the processor implements the combination into the map. If a third set of readings happens to overlap with the two sets of readings as well, the processor considers multiple variations of combinations between the three sets of data, and if the processor finds a combination which results in readings with higher confidence level, the processor will implement it into the map. In some embodiments, prior to combining two or more sets of data observed within separate fields of view, such as two or more sets of overlapping depth readings or visual readings observed within different fields of view, the processor calculates a probability of overlap between the two or more sets of data for multiple versions of combination between the two or more sets of data, each combination having a different area of overlap between the sets of data. In one embodiment, the processor uses the overlap with highest probability of overlap for stitching the two or more sets of data together. In other embodiments, the processor does not combine two or more sets of data having a probability of overlap below a specified threshold.

The method of a processor of an autonomous vehicle sharing and combining local and remote readings taken by sensing devices mounted on other autonomous vehicles operating within the same environment is repeated. The processor of the autonomous vehicle constructs an extended map of the environment by combining readings collected locally and remotely by multiple sensing devices mounted on various autonomous vehicles positioned at different locations throughout the environment and/or fixed sensing devices monitoring the environment, allowing the autonomous vehicle to see beyond the surroundings it has discovered itself. In some embodiments, the representation of the environment can be of various forms. For example, an image, a map or a collection of data points. In some embodiments, combined readings are readings collected by the same sensing device or from other sensing devices operating within the same environment and/or fixed sensing devices monitoring the environment. In some embodiments, combined readings are captured at the same time or at different times.

In another exemplary embodiment, an autonomous vehicle, equipped with a depth measurement device, camera, LIDAR and sonar moves within an environment, the depth measurement device continuously taking depth readings from the depth measurement device to objects within the environment, the camera continuously taking visual readings of the environment and the sonar continuously monitoring the surrounding obstacles. A processor of the autonomous vehicle combines collected readings of the same type, using overlapping readings taken within separate fields of view as attachment points, to form a map of the environment. In this example, the map includes locations observed by its mounted sensing devices and hence visited by the autonomous vehicle. To construct a map including locations which were not visited by the autonomous vehicle and observed by its mounted sensing devices, processors of autonomous vehicles operating within the same environment (or which have previously operated within the same environment) share their sensor readings with one another and processors of autonomous vehicles combine their own sensory readings with readings from remote sources to construct an extended map of the environment, discovering areas beyond their respective fields of view of their sensing devices. For example, consider that at the same time, depth measurement devices, cameras, LIDARs, sonars and other types of sensing equipment and devices installed on, for example, other autonomous vehicles operating within the same environment, continuously measure depths, capture visual readings and monitor obstacles while moving within the same environment. The processor of each or a portion of autonomous vehicles operating within the same environment shares readings, such as depth readings, visual readings and images, collected by sensing devices, such as depth measurement devices, cameras, LIDARs, sonars or any other type of sensing equipment and devices, with all other autonomous vehicles or with a select group of vehicles operating within the same environment with whom a data transfer channel (DTC) is established. The processor of each autonomous vehicle processes readings received from remote sources (i.e. other autonomous vehicles operating within the same environment and/or fixed sensing devices monitoring the environment) to check if there is any overlap with readings collected by the local source itself (i.e. the autonomous vehicle receiving the readings). Each processor identifies areas of overlap and uses them as connecting points. By combining readings from the local and remote source the processor constructs an extended map of the environment.

In some embodiments, the confidence level of readings within the map fluctuate. As the number of sets of overlapping readings increases, the confidence level of overlapping readings increases, providing improved accuracy of those readings within the area of overlap. However, since the confidence level of readings decrease with motion, the confidence levels, and hence the accuracy, of the readings within the map continuously fluctuate. For example, dead reckoning is used to calculate position, wherein each estimate of position is relative to the previous position. If displacement is measured using wheel rotation for example displacement readings have discrepancies due to slip and surface irregularities and since each estimate of position is relative to the previous position, confidence level decreases with motion as errors are cumulative.

In some embodiments, the processor replaces sensory readings with low confidence level or noise captured by the local source with readings observed by a remote source with higher confidence level. For example, a processor of an autonomous vehicle replaces readings of an area obstructed by a moving object by readings from a fixed monitoring device, such as a closed circuit television (CCTV) camera, observing the same area as that captured in the obstructed frame. In some embodiments, the processor associates confidence level with resolution of a sensor, rate of capturing data, speed of transfer, time stamp, time-to-live, the number of hops of the information, etc. In some embodiments, the processor improves accuracy of overlapping readings based on the confidence level of data within the overlapping area. In some embodiments, the processor uses the hamming distance between two sets of data to indicate confidence level of overlap between two sets of data. The hamming distance between two sets of data of equal length is the number of positions at which the corresponding readings from the two sets of data are different. For example, given one set of readings [12, 18, 22, 11] and a second set of readings [12, 16, 22, 13], the hamming distance is 2 as there are two positions between the two sets of data where corresponding readings are different. In some embodiments, the two sets of data are from two different sensing devices or are from the same sensing device and captured at different times. As the hamming distance between two sets of data decrease, the confidence level that the two overlap increases.

In some embodiments, the processor determines the confidence level of overlap between data from two separate sensing devices by considering the past confidence level of overlap between previous data from the two sensing devices and the rate of change of error between data from the two sensing devices over time. In some embodiments, the processor assigns a level of confidence to an overlap between two sets of data from two different sources, one set being from a first source and the other set being from a second source, the sources being different sensing devices. Over time the sets of data combined change, but they remain from the same first and second source. A high confidence level indicates a high confidence in overlap between sets of data from the first and second source. In some embodiments, one set of data (X) from a first source and another set of data (Y) from a second source may be used by the processor. Given that both sets of data are of equal length, the processor calculates the absolute difference between data X and data Y as the error.

$$error = |X - Y|$$

This provides the processor with an indication of the level of confidence for overlap between the two sets of data presently considered. However, the processor considers previous levels of confidence in overlap between previous sets of data from the first and second source when determining the level of confidence for overlap between the two sets of data presently considered and by calculating the error sum.

$$\text{error sum} = \int_0^t \text{error } dt$$

In some embodiments, the processor assigns the integral a limit such that only a limited portion of the history is considered. In some embodiments, the processor calculates a derivative D and uses it in gauging the level of confidence in overlap between the two sets of data presently considered, wherein a large rate of change in the error decreases the level of confidence in overlap.

$$D = \frac{\Delta error}{\Delta time}$$

In some instances, the processor uses the derivative as a best estimate of the future trend of the error in the overlap between a set of data from the first source and a set of data from the second source given the errors current rate of change.

In some embodiments, a processor of an autonomous or semi-autonomous vehicle constructs a map of the environment using readings collected within multiple fields of view of at least one sensing device, such as a camera or depth measurement device, mounted on the autonomous or semi-autonomous vehicle over a period of time. In some embodiments multiple different types of sensing devices, such as cameras, depth measurement devices and sonars, collect readings of the environment simultaneously and in other embodiments a single device or multiple devices of the same type collect readings of the environment.

In some embodiments, the processor of each or a portion of autonomous vehicles operating within the same environment stores local and remote readings in temporary memory such that the readings are only available during an operational session or in more permanent forms of memory such that the readings are available at the next session or startup. In other embodiments, the processor stores readings remotely on an external device or the cloud.

Due to measurement noise, in some embodiments, discrepancies between the value of overlapping readings within the area of overlap between two fields of view exists and the values of the overlapping readings are not the exact same. In such cases, the processor calculates new readings, or selects some of the readings as more accurate than others. For example, the processor combines the overlapping readings from a first field of view and a second field of view (or more fields of view where more readings from other fields of view overlap, like more than three, more than five, or more than 10) using a moving average (or by applying some other measure of central tendency, like a median or mode) and adopts them as the new readings for the area of overlap. In some embodiments, the processor uses minimum sum of errors to adjust and calculate new readings for the overlapping area to compensate for the lack of precision between overlapping readings from a first and a second field of view. In some embodiments, the processor uses the minimum mean squared error to provide a more precise estimate of readings within the overlapping area. In other embodiments, the processor uses other mathematical methods to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings from two (or more) fields of view. The calculated readings are used as the new readings for the overlapping area. In another embodiment, the processor uses the k-nearest neighbors algorithm where each new reading is calculated as the average of the values of its k-nearest neighbors.

Some embodiments implement DB-SCAN on readings such as depths and related values like pixel intensity, e.g., in a vector space that includes both depths and pixel intensities corresponding to those depths, to determine a plurality of clusters, each corresponding to readings of the same feature of an object. Some embodiments execute a density-based clustering algorithm, like DBSCAN, to establish groups corresponding to the resulting clusters and exclude outliers. To cluster according to, for example, depth vectors and related values like intensity, some embodiments iterate through each of the depth vectors and designate a depth vector as a core depth vector if at least a threshold number of the other depth vectors are within a threshold distance in the vector space (which may be higher than three dimensional in cases where pixel intensity is included). Some embodiments then iterate through each of the core depth vectors and create a graph of reachable depth vectors, where nodes on the graph are identified in response to non-core corresponding depth vectors being within a threshold distance of a core depth vector in the graph, and in response to core depth vectors in the graph being reachable by other core depth vectors in the graph, where to depth vectors are reachable from one another if there is a path from one depth vector to the other depth vector where every link and the path is a core depth vector and is it within a threshold distance of one another. The set of nodes in each resulting graph, in some embodiments, can be designated as a cluster, and points excluded from the graphs can be designated as outliers that do not correspond to clusters.

Some embodiments then determine the centroid of each cluster in the spatial dimensions of an output depth vector for constructing maps. In some cases, all neighbors have equal weight and in other cases the weight of each neighbor depends on its distance from the depth considered or (i.e., and/or) similarity of pixel intensity values. In some embodiments, the processor only applies the k-nearest neighbors algorithm to overlapping depths with discrepancies. In some embodiments, the processor fixes a first set of readings and uses it as a reference while transforming the second set of readings, overlapping with the first set of readings, to match the fixed reference. In one embodiment, the processor combines the transformed set of readings with the fixed reference and uses the combination as the new fixed reference. In another embodiment, the processor only uses the previous set of readings as the fixed reference. In some embodiments, the processor iteratively revises the initial estimation of a transformation function to align the newly read data to the fixed reference to produce minimized distances from the newly read data to the fixed reference. The transformation function can be the sum of squared differences between matched pairs from the newly read data and prior readings from the fixed reference. For example, in some embodiments, for each value in the newly read data, the processor finds the closest value among the readings in the fixed reference. In a next step, the processor uses a point to point distance metric minimization technique such that it will best align each value in the new readings to its match found in the prior readings of the fixed reference. The processor can use a point to point distance metric minimization technique that estimates the combination of rotation and translation using a root mean square. The processor iterates the process to transform the newly read values using the obtained information. In some embodiments, the processor uses these methods independently or combines them to improve accuracy. In one embodiment, the processor applies the adjustment applied to overlapping depths within the area of overlap to other depths beyond the identified area of overlap, where the new depths within the overlapping area are considered ground truth when making the adjustment.

In some embodiments, the processor uses a modified RANSAC approach where any two points, one from each data set, are connected by a line. The processor defines a boundary with respect to either side of the line. The processor considers any points from either data set beyond the boundary outliers and excludes them. The processor repeats the process using another two points. The process is intended to remove outliers to achieve a higher probability of the reading being true. Consider an extreme case where a moving object is captured in two frames overlapping with several frames captured without the moving object. The processor uses the approach described or RANSAC method to reject data points corresponding to the moving object. This method or a RANSAC method can be used independently or combined with other processing methods described above.

In some instances where linear algebra is used, the processor implements Basic Linear Algebra Subprograms (BLAS) to carry out operations such as vector addition, vector norms, scalar multiplication, matrix multiplication, matric transpose, matrix-vector multiplication, linear combinations, dot products, cross products, and the like.

In some embodiments, the processor constructs an extended map in a horizontal and/or vertical direction as readings are combined. The direction in which the map expands depends on the field of view of the sensing device(s) by which the readings to be combined were taken. For example, a processor of an autonomous vehicle that combines visual readings captured by a camera mounted on the autonomous vehicle with a line of sight parallel to the plane on which the autonomous vehicle operates with overlapping visual readings captured by a camera mounted on a different autonomous vehicle with a line of sight at an angle to the plane on which the autonomous vehicle operates expands a map in a vertical direction. If the lateral edges of the fields of view of both cameras do not align perfectly, then the map also expands in a horizontal direction. In some embodiments, the environment is represented by a map constructed of plotted readings or an ordered list of readings. In another embodiment, the environment is represented by a matrix, wherein every cell within the matrix is a coordinate representing an area within the environment. Other suitable forms of representing the environment are used in other cases.

In some embodiments, a processor of an autonomous or semi-autonomous vehicle, such as an automobiles or robotic device, tracks its position relative to other vehicles operating within the same environment and/or fixed sensing devices monitoring the same environment. In cases wherein the processor of the autonomous or semi-autonomous vehicle knows the position of an autonomous vehicle or fixed sensing device from which readings are received, the accuracy of the constructed map is improved as the processor can better estimate the overlap between readings. In some embodiments, the position of vehicles and/or robotic devices operating within the environment are determined using a device such as an emitting beacon while in other embodiments each autonomous vehicle shares its location with other autonomous vehicles using a DTC. In some embodiments, the processor of each autonomous vehicle localizes itself using devices such as GPS, odometer, gyroscope, or by using techniques such as optical flow, structure from motion, and the like. Examples of methods for localization of a robotic device are described in U.S. Patent Application 62/746,688, 62/740,573, Ser. Nos. 15/95,480, 15/425,130, and 15/955,344, the entire contents of which are hereby incorporated by reference.

In some embodiments, a processor of an autonomous (or semi-autonomous) vehicle considers multiple possible scenarios wherein the autonomous vehicle is located in other likely locations in addition to the location estimated by the processor. As the autonomous vehicle moves within the environment, the processor gains information of its surroundings from sensory devices which it uses to eliminate less likely scenarios. For example, consider a processor of an autonomous vehicle estimating itself to be 100 cm away from a wall. To account for measurement noise the processor considers additional likely scenarios where the vehicle is, for example, 102, 101, 99 and 98 cm away from the wall. The processor considers these scenarios as possibly being the actual true distance from the wall and therefore reduces its speed after traveling 98 cm towards the wall. If the vehicle does not bump into the wall after traveling 98 cm towards the wall it eliminates the possibility of it having been 98 cm away from the wall and the likelihood of the vehicle being 99, 100, 101 and 102 cm away from the wall increases. This way as the autonomous vehicle travels within the environment, the processor adjusts its confidence of its location with respect to other autonomous devices and the environment based on observations and information gained of the surroundings. In some cases, such a method reduces collisions. In an alternative visualization of this approach the processor inflates the surface area occupied by the autonomous device such that it is hypothesized that the autonomous device occupies all state spaces falling within the borders of the inflated surface area. Since the error of perceived position of the vehicle increases with movement, the processor inflates the surface area occupied by the autonomous device with every movement. The processor deflates the surface area occupied by the autonomous device when occupancy of a hypothesized state space falling within the borders of the surface area is proven to be false, thereby reducing the number of state spaces and hence area occupied by the autonomous device. In this example, wherein the surface area occupied by the autonomous device is equivalent to the integral of all state spaces falling within the borders of the surface area, the occupancy of all state spaces is uniformly distributed. In some embodiments, the inflation and deflation is not the same in all directions. In some embodiments, the amounts of inflation and deflation in different directions depends on the type of motion, noise, sensors, etc. A more detailed description of this method of localization is described in U.S. Patent Application 67/740,580, the entire contents of which is hereby incorporated by reference.

In some embodiments, where multiple sensing devices are used to observe the environment, the processor assigns a weight to the data collected by each sensing device as certain sensing devices are more accurate than others under particular conditions. The processor determines the value of the weight based on various factors, such as weather conditions, geographical location, acoustic conditions, and the like. In some embodiments, the processor ignores readings if the weight of readings taken by a specific sensing device is less than a predetermined amount for particular conditions. For example, the readings from LIDAR sensors, cameras and sonar sensors of an autonomous vehicle each have different weight in different environmental conditions. Assuming the processor determines the weight based on weather conditions and geographical location, data collected from cameras for example, have a low weight under snowy conditions while data collected from sonar sensors have a higher weight as sonar sensor readings are unaffected by snow. However, in mountainous areas for example, data collected by sonar sensors have lower weight as they are easily affected by reflectivity. Sonar sensors also perform poorly under thunderstorm conditions or in an environment with loud acoustics and hence the processor assigns its readings a lower weight under such circumstances.

In some embodiments, the processor considers readings from a sensing device an outlier and ignores them if they are significantly different from readings taken by other sensing devices. In other embodiments, the processor ignores all or some readings from a sensing device if multiple readings taken by the same device are not consistent. In some embodiments, if similarity in readings taken by different sensing devices is observed, the processor assigns those readings a higher weight and considers them to be more accurate.

In some embodiments, the processor assigns the DTC link between two agents (or vehicles or robotic devices) a value between 0 and 1, wherein a value of 1 signifies a strong link. If the readings from the remote source are useful to the processor of the agent receiving the information, then the processor increases the strength of the link and the confidence level in information received from the remote source. If the readings from the remote source are useless to the processor of the agent, the processor decreases the strength of DTC link and, if repeatedly useless, the processor eventually discards the readings from the remote source. For example, if readings from a remote source has good overlap with readings from the local source and improves the accuracy of its map, the processor considered the information from the remote source to be useful and increases the strength of the link. As a further example, if readings from a remote source indicate an opening at a specific location in the map and the local source travels to the opening and finds a wall, then the readings from the remote source were not helpful and the processor decreases the strength of the link and the confidence level of its readings. Examples of other methods for establishing a relationship between two or more autonomous robots are described in U.S. patent application Ser. Nos. 15/981,643, 15/986,670, and 15/048,827, the entire contents of which are hereby incorporated by reference.

In some embodiments, the processor of an agent uses a Markov Decision Process (MDP) consisting of a sequence of states and actions followed by rewards to help establish with which sources a strong DTC link can be formed. For example, the processor assigns a reward with higher value for an action of combining local readings of, for example, one robotic device with remote readings from another robotic device resulting in readings with higher confidence level as compared to the value of the reward assigned if the combination of readings resulted in readings with lower confidence level. A greater reward assigned as a result of collaboration with a particular source translates to stronger DTC link with that particular source. Actions are taken by, for example, an autonomous robotic device to transition from one state to another and after transitioning to each new state a reward is assigned. For two collaborating robotic devices, for example, both transition to a new state after taking an action to collaborate. The processor assigns the reward to both collaborators in one embodiment and in other embodiments divides the reward non-proportionally or is provided to one robotic device and back propagated to the other. For a sequence of states and actions of a robotic device, the net reward is the sum of rewards received for the sequence of states and actions, with future rewards discounted. The expected net reward for the execution of a sequence of states and actions is given by a state-action value function. In some embodiments, the goal of the processor is to find the optimal state-action value function by identifying the sequence of states and actions with highest net reward. Since multiple actions can be taken from each state, over time as the number of states experienced, actions, and transitions increase, the goal of the processor is to also find an optimal policy that contains the action from each state with highest reward value. The processor considers the sequence of states (s) and actions (a) followed by rewards (r) assigned to a robotic device, for example.

$$s_t, a_t, r_{t+1}, s_{t+1}, a_{t+1}, r_{t+2}, s_{t+2}, a_{t+2}, r_{t+3}, \ldots r_T, s_T, a_T$$

The processor calculates the net return $R_T$ to be expected in the future as the sum of the rewards received for the sequence of states and actions beginning from state $s_t$ and ending with terminal state $s_T$.

$$R_T = r_{t+1} + \gamma^1 r_{t+2} + \ldots + \gamma^{T-t-1} r_T$$

The processor applies a discount factor $\gamma$ ($0 \leq \gamma < 1$) as distant rewards are less important. The processor calculates the value of a state-action pair $Q(s, a)$ as the expected return $R_T$ for the sequence of states and actions beginning with state $s_t$ and action $a_t$ and ending with terminal state $s_T$.

$$Q(s,a) = E[R_T | s_t = s, a_t = a]$$

The processor identifies the optimal value function $Q^*(s, a)$ by finding the sequence of states and actions which maximize the state-action value function $Q(s, a)$.

$$Q^*(s,a) = \max E[R_T | s_t = s, a_t = a]$$

And the processor derives the optimal policy for each state by identifying the highest valued action that can be taken from each state.

$$\pi^*(s) = \mathrm{argmax}\, Q^*(s,a)$$

To iteratively calculate the value function as actions within the sequence are executed and the robotic device transitions from one state to another, the processor applies the Bellman Optimality equation, the optimal value function obeying Bellman Optimality equation.

$$Q^*(s_t, a_t) = E[r_{t+1} + \gamma \max Q^*(s_{t+1}, a_{t+1})]$$

The equation expresses that the value for a given state $s_t$ and action $a_t$ should represent the current reward $r_t$ observed for state $s_t$ plus the maximum discounted $\gamma$ future reward expected for the next state $s_{t+1}$ the robotic device would end up in. The processor uses this equation to iteratively calculate the state-action value for a given state $s_t$ and action $a_t$.

$$Q_{i+1}(s_t, a_t) = E[r_{t+1} + \gamma \max Q_i(s_{t+1}, a_{t+1})]$$

In some embodiments, the sequence of states and actions corresponds to, for example, the states the robotic device visits and actions it takes during a work session. Over time, as the robotic device visits more states and as it evaluates different actions from each state, the system will converge to find the most optimal action to take from each state thereby forming an optimal policy. Further, as the processor of the robotic device evaluates different sequences of states and actions over time, the system will converge to the most optimal sequence of states and actions. In determining the optimal policy, the processor of an agent (e.g., autonomous vehicles or robotic devices) forms, strengthens, weakens or ends DTC links with other agents, with the goal of maximizing the reward.

In some embodiments, an agent is an observer or an actuator. In some embodiments, the DTC link is a one-way connection between an observer and an actuator, two actuators or two observers. In some embodiments, the DTC link is bidirectional or in a more complex form. For a DTC link between an observer and actuator, the processor may reinforce the DTC link if:

$$\exists o(t) \in O \land \exists u(t) \in U, u(t) | o(t-1) \Rightarrow P[r^*(t) > r(t)]$$

where o(t) is an observation within the set of observations O, u(t) is an action within the set of actions U, and r*(t) is the optimal reward compared to all rewards in {r}, $\land r \in \{r\} | P[r^* > r]$.

For two actuators with actions $u_1$ and $u_2$, $$\exists u_1(t) \in U \land \exists u_2(t) \in U$$

the processor achieves maximum reward by, for example, enforcing actuators to collaborate and save time in completing a task wherein the sum of the reward of $r_1$ and $r_2$ at time t is larger than the sum of $r_1$ at time t and $r_2$ at time t+1:

$$(r_1 + r_2)(t) | (u_1 + u_2)(t) > r_1(t) + r_2(t+1) | (u_1(t) + u_2(t+1))$$

For two receivers, the processor achieves maximum reward by, for example, enforcing receivers to share information for useful information gain. The processor quantifies useful information gain using conditional entropy:

$$H(O_1 | O_2) = H(O_1 | O_2) - H(O_1) + H(O_2)$$

where, the combination of observations $O_1$ and $O_2$ reduce the entropy H of observation $O_1$ given its combination with observation $O_2$ for useful information gain. For example, useful information gain is achieved when a processor combines data captured from two CCTV cameras to produce a higher resolution image or portion of an image. The goal is to form relationships between agents that provide the most reward. Although examples provided herein discuss relationships between two agents, each connected to one another through a one-way communication link, the number of connected robots or vehicles are unlimited given that computing cost is not a limiting factor. Furthermore, in some embodiments, connections between agents are more complex where, for example, links are one agent to many agents or many agents to one agent.

In some embodiments, there is noise in the data of the observer and the actuator. Therefore, the processor considers a probability for the accuracy of observation of the observer agent (OA) and the action of the actuator agent (AA) when determining the expected reward.

$$P(AA|OA) = \frac{P(OA|AA)P(AA)}{P(OA)}$$

P(OA|AA) is the probability of the OA making an observation given that the AA executes a particular action, P(AA) is the probability of the AA taking a particular action independent of the observation, and P(OA) is the probability of the OA having made an observation.

In some embodiments, the methods described herein do not assume an inherent superiority in locally captured readings versus remotely captured readings. The methods of the embodiments described herein rely on the degree of alignment between sets of readings, as opposed to the source of the readings. Furthermore, in the methods of embodiments described herein, an assumption of inherent superiority in the time stamp of captured readings is not made. For example, if a set of readings captured by a remote source at time t produces higher confidence level than a set of readings with same field of view captured locally at some other time t', the processor replaces the readings from the local source by those captured by the remote source. Embodiments described herein consider the time stamp of readings as less important than the alignment between the data. For example, consider a robot moving in a one-dimensional world along a straight line in the x direction with constant positive or negative speed. At time $t_0$ the robot is at position $x_0$ and at tine $t_1$, the robot is at position $x_1$, continuing along, at time $t_5$ the robot is at position $x_5$. To move the robot back to position $x_4$, the speed can acquire a negative value or time can be reversed and moved one step backwards to time $t_4$. Expanding the latter concept to a multidimensional day-to-day life where vehicles such as robotic devices and automobiles have a state space of (x, y, θ) with the constraint of a static environment, there is no theoretical difference between, for example, robotic device A observing a feature $f_1(z)$ at state $(x_1, y_1, \theta_1)$ today and robotic device B observing the same feature $f_1(z)$ at state $(x_1, y_1, \theta_1)$ yesterday. In this example time is irrelevant and readings from the past, present and future are considered by the processor when attempting to find the best alignment between sets of readings. In one embodiment, a processor of an autonomous vehicle combines time stamps with state space to form a space-time framework with a given origin.

By way of further illustration and analogy, in some embodiments, construction of the map can be thought of as a puzzle, where each set of readings is a piece belonging to the puzzle. Initially pieces considered are pieced together based on commonalities between puzzle pieces, such as shape and color, with some level of certainty. In the case of sensory readings available to the processor of the vehicle, the processor pieces them together based on commonalities such as values of readings and/or patterns in the readings or similar features. As new puzzle pieces are considered with time, previously considered puzzle pieces are displaced if a new puzzle piece has a better fit in its position. In the same way, as new puzzle pieces are added previously considered puzzle pieces can find a better fit at another position with another puzzle piece. Therefore, pieces in the puzzle are constantly moving as new pieces are added in order for each piece to find its best fit within the entire puzzle. This is the same for sensory readings of some embodiments used in constructing a map, where the processor is constantly moving sets of readings based on achieving the best alignment possible. For example, the processor of a robotic device or any other autonomous vehicle determines that a previous set of readings from another work session has a higher level of confidence in overlap with a new set of readings than with the readings collected in the current work session. Or the processor determines that a new set of readings has better overlap with readings in a particular area of the map than the readings currently in that particular area of the map and therefore the processor replaces those old readings with the new readings. In this way, the processor is continuously evolving the map and the confidence levels of readings are continuously fluctuating.

The invention is not to be limited to any type of sensing device or any type of approach or method used for perceiving, measuring or calculating readings, such as depths, which is not to suggest that any other description herein is limiting. The devices and methods used herein are for illustrative purposes.

FIG. 1A illustrates first depth measurement device 100 mounted on first autonomous vehicle 101 taking depth readings 102 within field of view 103. Depth readings 102 taken by first depth measurement device 100 measure the depth from first depth measurement device 100 to object 104. Second autonomous vehicle 105 uses mounted depth measurement device 106 to take depth readings 107 within field of view 108 partly overlapping depth readings 102 within field of view 103 taken by depth measurement device 100 mounted on first autonomous vehicle 101. A processor of first autonomous vehicle 101 stores depth readings 102 in a memory to create its own map and shares depth readings 102 with a processor of second autonomous vehicle 105 operating within the same environment through a wireless DTC. The processor of second autonomous vehicle 105 stores depth readings 107 in a memory for creating its own map and shares depth readings 107 with the processor of first autonomous vehicle 101 operating within the same environment. As the processor of each autonomous vehicle receives readings from a remote source, it stores the readings in memory. In some embodiments, the processor considers depth readings received from remote sources less accurate than depth readings from the local source. The processor of each autonomous vehicle compares the readings received from the remote source to readings in its map to check for any overlap between the two sets of data. In checking for overlap, the processor considers several alignment combinations of the two sets of data, each one with different overlapping areas. The processor uses this step to filter data, determine if and where there is overlap, and if there is overlap, which combination gives readings with highest confidence level. If overlap is found, the processor implements the combined readings into the map, otherwise the processor stores the readings from the remote source for future combinations considered. For example, when the processor of autonomous vehicle 101 receives depth readings 107 it stores readings 107. The processor also compares depth readings 107 from autonomous vehicle 105 to depth readings 102 within its own map and identifies area of overlap 109, where values of depth readings within area 109 are similar between readings 102 and 105. The processor considers multiple variations of combining depth readings 107 and depth readings 102, and implements the variation that result in readings with highest confidence level into the map of autonomous vehicle 101. In the same way, the processor of autonomous vehicle 105 receives readings 102 from the processor of remote source 101 and applies the same storage and processing methods to expand its own map. In some embodiments, readings received from remote sources have a lower confidence level than readings received from a local source, therefore, maps may have readings with high confidence level in some areas and low confidence levels in others. As the processor adds more readings over time and the robotic device moves within the environment, the confidence level of readings fluctuates. For example, if several sets of readings overlap, the confidence level of the readings within the area of overlap increases as similar depths were measured from several sets of data. Further, confidence levels of readings also decrease with motion due to movement and measurement noise.

Figure 1B:
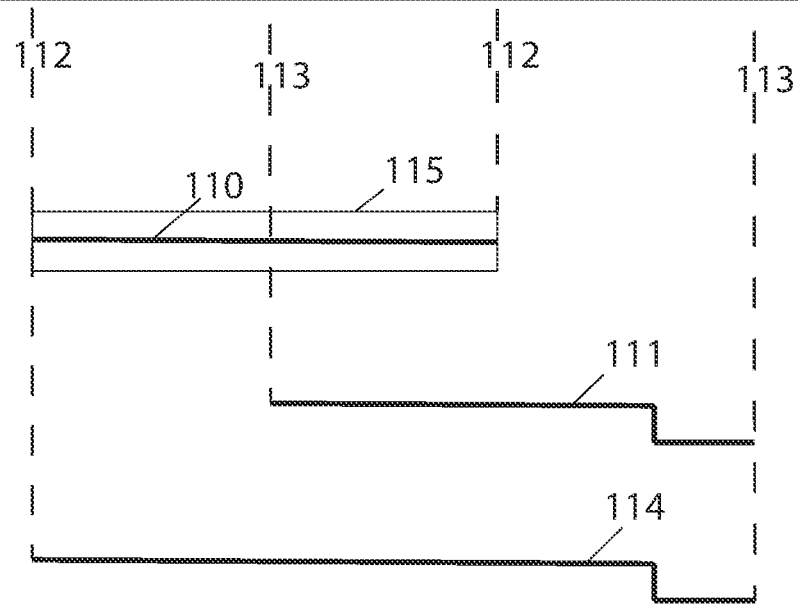
FIG. 1B illustrates a 2D map segment constructed from the combination of overlapping depth readings from two different sources, as provided in some embodiments.

FIG. 1B illustrates an embodiment where 2D map segments 110 and 111 resulting from depth measurements 102 and 107, respectively. Segments 110 and 111 are bounded by dashed lines 112 and 113, respectively. 2D map segment 114 constructed from 2D map segments 110 and 111 by the processor of autonomous vehicle 101 and bounded by the outermost dashed lines of 112 and 113 is also illustrated. The processor identifies area of overlap 109 between new depth measurements 107 and previously taken depth measurements 102 when a predetermined number of consecutive depth values measured are similar to within a threshold. Once an area of overlap is identified the processor extends the overlap to include depth measurements recorded immediately before and after the identified overlapping area. The processor calculates new depth measurements from the overlapping depth measurements for the area of overlap using a mathematical method (as described above) to estimate more realistic depth measurements. The processor considers several variations of alignment combinations between readings 102 and 107. The processor implements the alignment combination that results in the highest confidence level of depth readings into the overlapping area of the map of autonomous vehicle 101. To construct larger map segment 114, the processor combines previously constructed 2D map segment 110 and 2D map segment 111 at the area of overlap bound by innermost dashed lines of 112 and 113. The processor repeats this method of combining two sets of depth readings at the identified area of overlap to construct a map of the environment. In this embodiment shown, only two autonomous vehicles operate within the same environment for simplicity; however, the concept of collaborative map building described can be applied to any number of autonomous vehicles operating within the same environment.

Figure 2A:
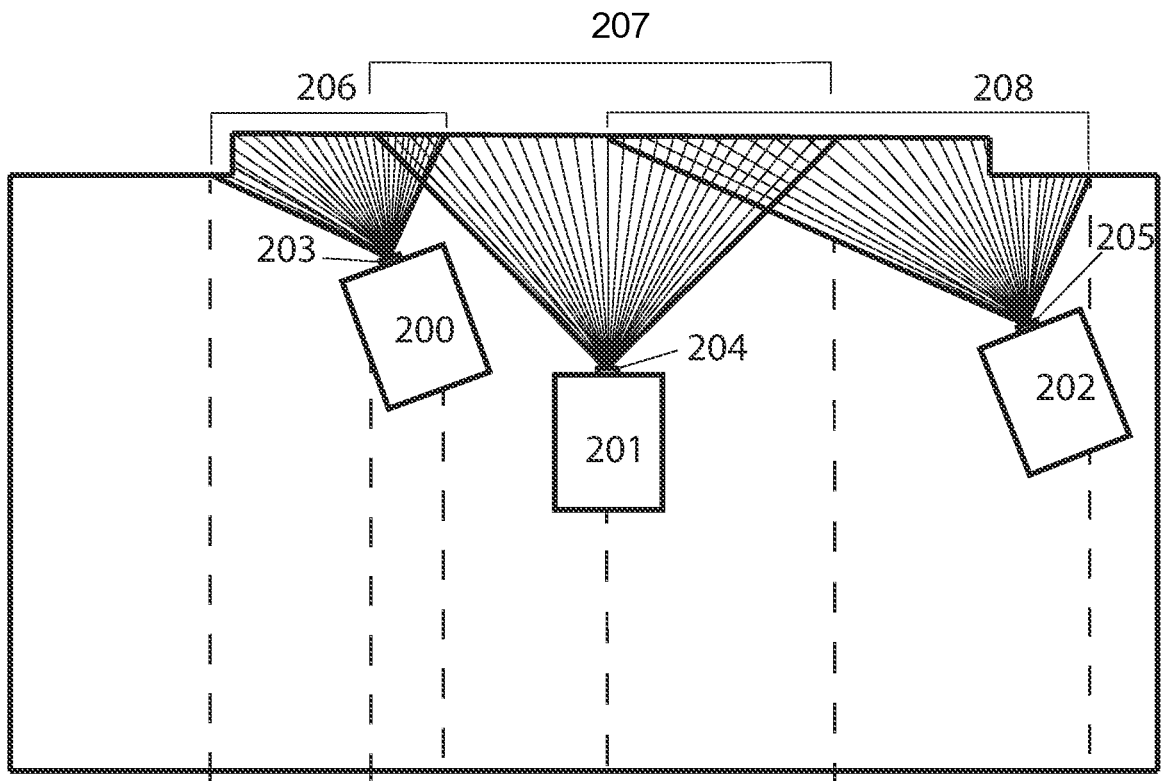
FIG. 2A illustrates three depth measurement devices taking depth readings within their respective fields of view, as provided in some embodiments.
Figure 2B:
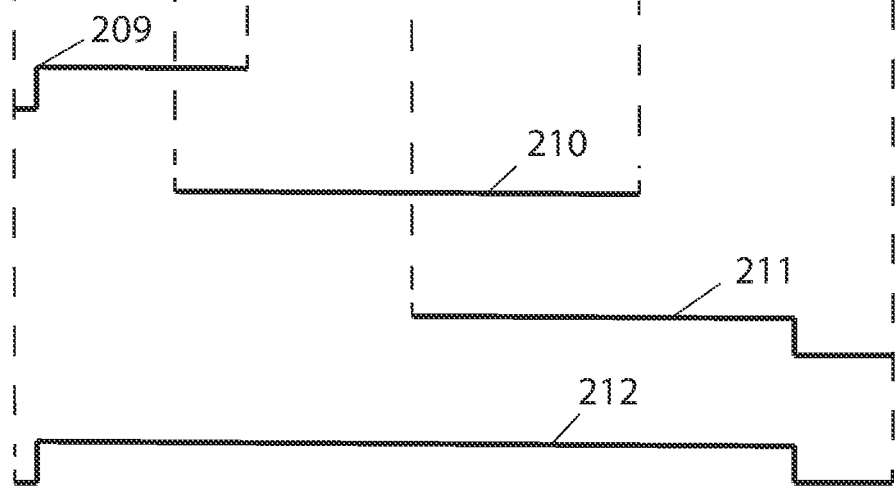
FIG. 2B illustrates a 2D map segment constructed from the combination of overlapping depth readings from three different sources, as provided in some embodiments.
Figure 2C:
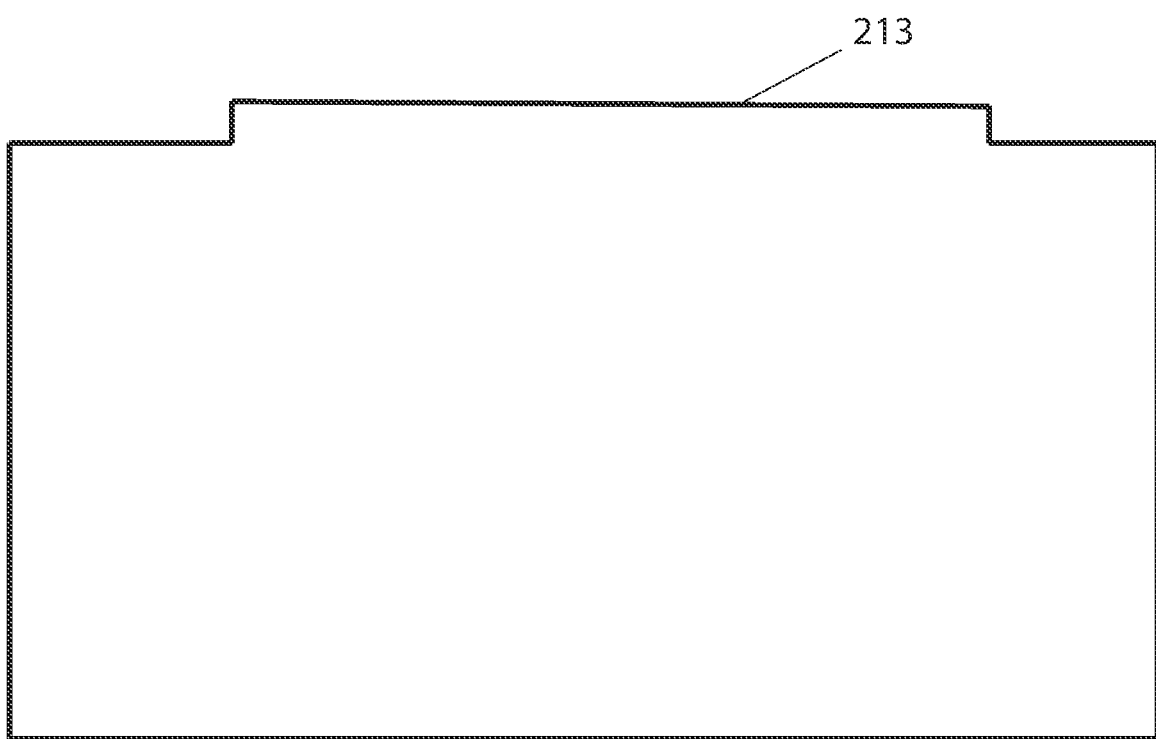
FIG. 2C illustrates a 2D map constructed from the combination of depth readings from three different sources, as provided in some embodiments.

FIG. 2A illustrates an embodiment where autonomous vehicles 200, 201 and 202 each with mounted depth measurement device 203, 204 and 205, respectively, operating within the same environment. Depth readings 206, 207 and 208 are taken by depth measurement device 203, 204 and 205 of autonomous vehicle 200, 201 and 202, respectively. FIG. 2B illustrates map segments 209, 210 and 211 constructed by a processor of autonomous vehicle 200 from depth measurements 206, 207, and 208, respectively, all taken from different autonomous vehicles operating within the same environment. With all depth measurements taken shared between processors of all autonomous vehicles operating within the same environment, assuming all have established DTC with one another, the processor of autonomous vehicle 200 (and processors of autonomous vehicles 201 and 202) constructs larger 2D map segment 212 from depth measurements 206, 207 and 208 taken by separate autonomous vehicles 200, 201 and 202, respectively. As autonomous vehicles 200, 201 and 202 continue to move within the environment processor share new depth readings and combine them to construct a map of the environment. FIG. 2C illustrates an example of a closed loop 2D map of environment 213 constructed by the processor of autonomous vehicle 200. For simplicity, the illustration assumes processors of autonomous vehicles 200, 201 and 202 all have DTC connection with one another and of equal strength. Furthermore, all readings, local and remote have same confidence level. In this way, the processors of the three vehicles share the exact same map. However, autonomous/semi-autonomous vehicles and/or robotic devices operating within the same environment can have different maps as the processor of each vehicle can have different DTC connections with processors of remote sources or can share some of the same DTC connections with other processors of remote sources but have DTC connections with different strengths, affecting the confidence in the readings received and hence the overall map. Further, processors of different vehicles can use different processes to combine readings or only combine readings when useful to the autonomous vehicle.

In some embodiments, the processor of an autonomous vehicle assigns a weight to each reading. In some instances, the processor determines the value of the weight based on various factors, such as a reading's position with respect to an adjustment range, wherein readings within the adjustment range have a positive effect on the weight. For example, in FIGS. 1A and 1B, new depth measurements 107 whose value falls within adjustment range 114 have a more positive effect on the weight than those whose value falls outside adjustment range 114. Other factors can influence the value of the weight of readings, such as the degree of similarity between readings recorded from separate fields of view, the weight of neighboring readings, wherein neighboring readings with higher weight have a positive effect on the weight, or the number of neighboring readings with high weight. In some embodiments, the processor ignores readings with weight less than a predetermined amount as readings with higher weights are considered to be more accurate. In another embodiment, the processor assigns readings with higher weight a more accurate rating. In some embodiments, the processor increases or decreases the weight corresponding to each reading with each reading taken within each field of view. Over many fields of view the processor may increase and decrease the weight of a reading. In some embodiments, processors of different devices operating within the same environment use the same methods for assigning weight to readings or use some of the same methods or completely different methods for assigning weight.

Figure 3:
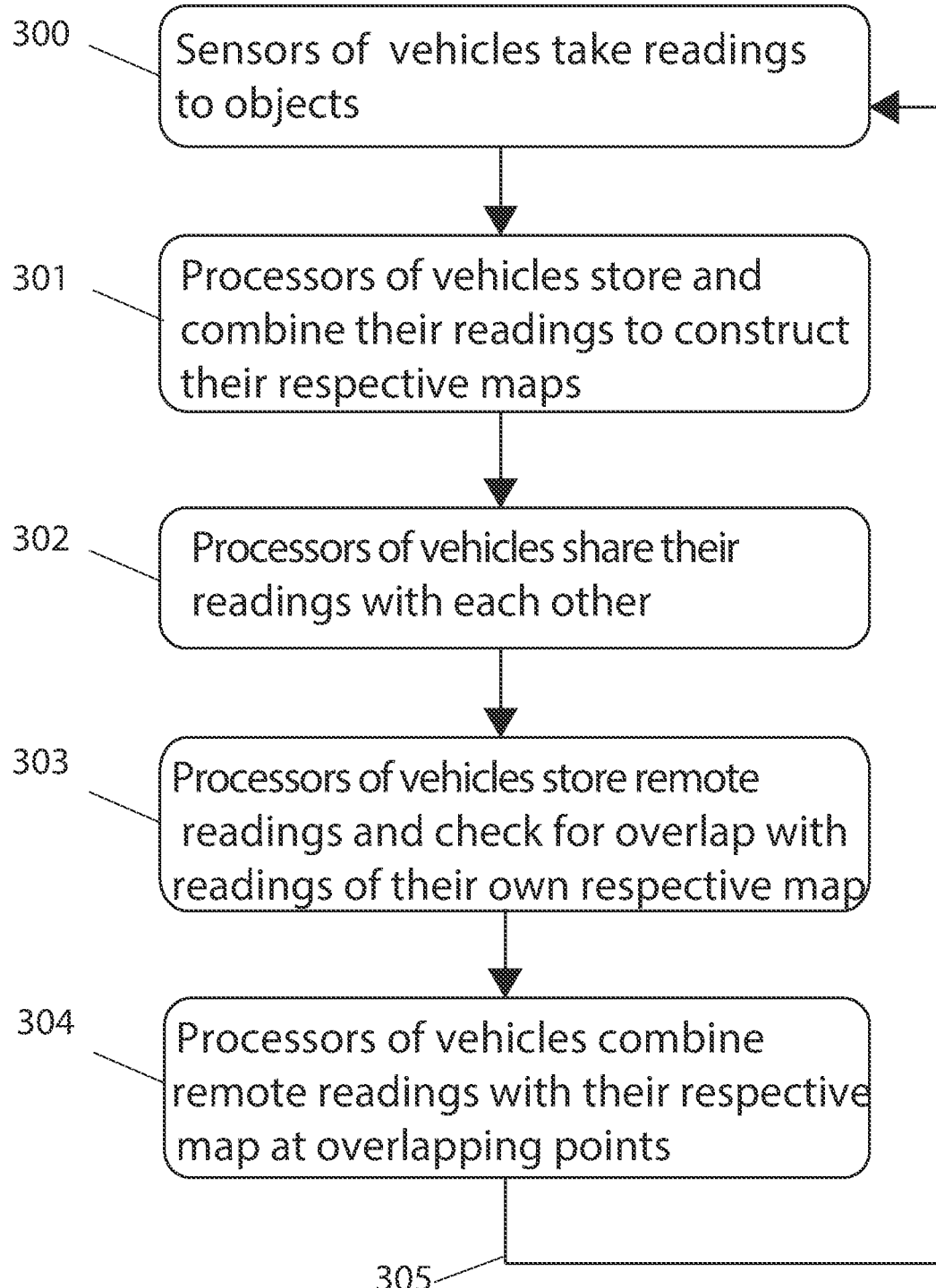
FIG. 3 illustrates a flow chart describing embodiments of a method for collaboratively constructing a map, as provided in some embodiments.

FIG. 3 illustrates a flowchart describing embodiments of a method for collaboratively constructing a map of an environment. In a first step 300, a first sensor of a first autonomous vehicle and second sensor of a second autonomous vehicle, both operating within the same environment, take readings to objects within their respective fields of view. In a second step 301, a processor of each autonomous vehicle stores their local readings in a memory and combines overlapping readings to construct a map of the environment. In a third step 302, the processors of each autonomous vehicle share their readings with one another using an established DTC. In a fourth step 303, the processor of each autonomous vehicle stores the readings received from the remote source in their respective memories and checks if the remote readings received overlap with any readings within their respective maps. In a fifth step 304, the processor of each autonomous vehicle combines remote readings overlapping with readings within their respective map, using overlapping readings as attachment points. In a sixth step 305, the process is repeated as processors of the autonomous vehicles operating within the same environment continue to share their readings with one another, such that each processor may construct a map that provides knowledge of areas beyond those discovered by each processor itself.

Figure 4:
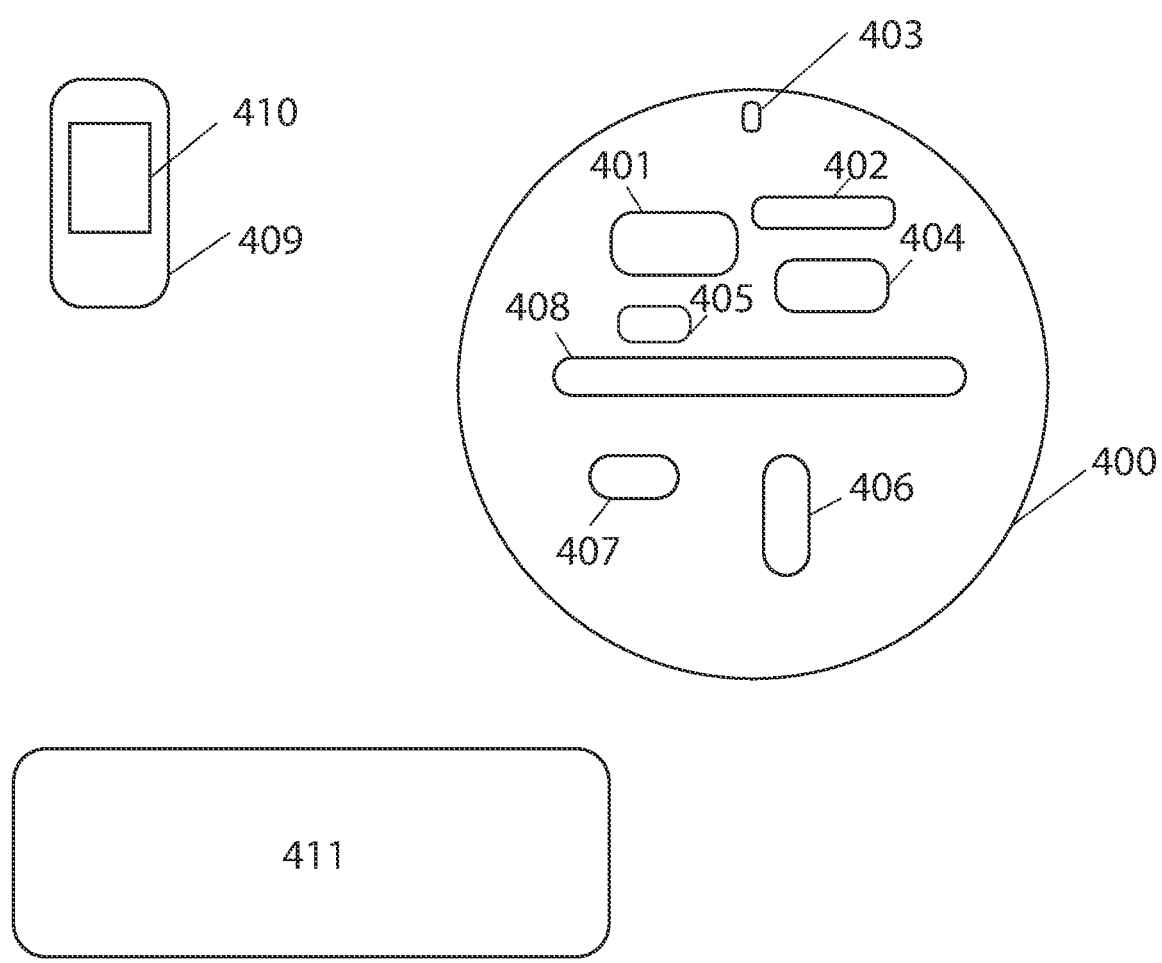
FIG. 4 illustrates an example of a vehicle and system as used in some embodiments.

FIG. 4 illustrates an example of a vehicle 400 with processor 401, memory 402, a first set of sensors 403, second set of sensors 404, network communications 405, movement driver 406, timer 407, and one or more cleaning tools 408. The first and second set of sensors 403 and 404 may include depth measuring devices, movement measuring devices, and the like. In some embodiments, the robotic device may include the features (and be capable of the functionality) of a vehicle described herein. In some embodiments, program code stored in the memory 402 and executed by the processor 401 may effectuate the operations described herein. Some embodiments additionally include user or operator device 409 having a touchscreen 410 and that executes a native application by which the user or operator interfaces with the vehicle. In some embodiments, the vehicle 400 may charge at a base station 411, which in some cases may house a processor and memory that implement some of the functionality described herein and which may wirelessly communicate with the vehicle 400. In some embodiments, a plurality of such vehicles 400 are used to perform the methods described herein. While many of the computational acts herein are described as being performed by the vehicle, it should be emphasized that embodiments are also consistent with use cases in which some or all of these computations are offloaded to a base station computing device on a local area network with which the vehicle communicates via a wireless local area network or a remote data center accessed via such networks and the public internet.

In some embodiments, the processor of an autonomous vehicle processes and translates information sensed by a sensor into depth measurements and uses them to construct a map as described above. In some embodiments, the processor reports the depth measurements in a standardized measurement unit, such as millimeter or inches, for visualization purposes, or are reported in non-standard units. The processor can infer (or otherwise perceive or measure) depth in various ways. For example, the processor infers depths based (e.g., exclusively based on or in combination with other inputs) on pixel intensities from a depth image captured by a depth camera. Or the processor infers depths from the time it takes for an infrared light (or sound) transmitted by a sensor to reflect off of an object and return back to the depth perceiving device or by a variety of other techniques. For example, using a time-of-flight camera, a processor estimates depth based on the time required for light transmitted from a robot to reflect off of an object and return to a camera on the robot, or using an ultrasonic sensor, the processor estimates depth based on the time required for a sound pulse transmitted from a robot-mounted ultrasonic transducer to reflect off of an object and return to the sensor. In some embodiments, a one or more infra-red (IR) (or with other portions of the spectrum) illuminators (such as those mounted on a robot) projects light onto objects (e.g., with a spatial structured pattern (like with structured light), or by scanning a point-source of light), and the resulting projection is sensed with one or more cameras (such as robot-mounted cameras offset from the projector in a horizontal direction). In resulting images from the one or more cameras, the processor uses position of pixels with high intensity to infer depth (e.g., based on parallax, based on distortion of a projected pattern, or both in captured images). In some embodiments, the processor uses raw data (e.g., sensed information from which depth has not been inferred), such as time required for a light or sound pulse to reflect off of an object or pixel intensity directly (e.g., without first inferring depth) in creating a map of an environment, which is expected to reduce computational costs, as the raw data does not need to be first processed and translated into depth values, e.g., in metric or imperial units.

In some embodiments, raw data is provided in matrix form or in an ordered list (which is not to suggest that matrices cannot be encoded as ordered lists in program state). When a processor directly uses the raw data of a sensor, extra steps are bypassed and the processor uses raw values and relations between the raw values to perceive the environment and construct the map directly without converting raw values to depth measurements with metric or imperial units prior to inference of the map (which may include inferring or otherwise perceiving or measuring a subset of a map, like inferring a shape of a piece of furniture in a room that is otherwise mapped with other techniques). For example, in some embodiments, where at least one camera coupled with at least one IR laser is used in perceiving the environment, a processor infers depth based on the position and/or geometry of the projected IR light in the image captured. For instance, some embodiments infer map geometry (or features thereof) with a trained convolutional neural network configured to infer such geometries from raw data from a plurality of sensor poses. Some embodiments apply a multi-stage convolutional neural network in which initial stages in a pipeline of models are trained on (and are configured to infer) a coarser-grained spatial map corresponding to raw sensor data of a two-or-three-dimensional scene and then later stages in the pipeline are trained on (and are configured to infer) finer-grained residual difference between the coarser-grained spatial map and the two-or-three-dimensional scene. Some embodiments include three, five, ten, or more such stages trained on progressively finer-grained residual differences relative to outputs of earlier stages in the model pipeline. In some cases, objects are detected and mapped with, for instance, a capsule network having pose invariant representations of three dimensional objects. In some cases, complexity of exploiting translational invariance is reduced by leveraging constraints where the robot is confined to two dimensions of movement, and the output map is a two dimensional map, for instance, the capsules only account for pose invariance within a plane. The processor uses a digital image from the camera to detect the position and/or geometry of IR light in the image by identifying pixels with high brightness (or outputs of transformations with high brightness, like outputs of edge detection algorithms). The processor uses the raw data directly in perceiving the surroundings and constructing a map of the environment. The processor uses the raw pixel intensity values to determine the area of overlap between data captured within overlapping fields of view to combine data and construct a map of the environment. In the case of two overlapping images, the area in which the two images overlap contain similar arrangement of pixel intensities in at least a portion of the digital image. The processor detects this similar arrangement of pixels and stitches the two overlapping images at overlapping points to create a segment of the map of the environment without processing the raw data into depth measurements.

In a further example, a processor of an autonomous vehicle compares raw time-of-flight data measured for multiple points within overlapping fields of view to find overlapping points between captured data without translating the raw times into depth measurements, and in some cases, without first triangulating multiple depth measurements from different poses to the same object to map geometry of the object. The processor identifies the area of overlap by recognizing matching patterns among the raw data from the first and second fields of view, such as a pattern of increasing and decreasing values. The processor detects matching patterns by using similar methods as those discussed above for detecting matching patterns in depth values taken within two overlapping fields of views. In some embodiments, the processor uses this technique, combined with the movement readings from the gyroscope or odometer and/or the convolved function of the two sets of raw data to infer a more accurate area of overlap. The processor combines overlapping raw data in a similar manner as that described above for combing overlapping depth measurements. Accordingly, some embodiments do not require that raw data collected by the sensor be translated into depth measurements or other processed data (which is not to imply that "raw data" may not undergo at least some processing between when values are sensed by a sensor and when the raw data is subject to the above techniques, for instance, charges on charge-coupled image sensors may be serialized, normalized, filtered, and otherwise transformed without taking the result out of the ambit of "raw data").

In some embodiments, a processor determines depths by measuring a vector with a vehicle (or camera of the vehicle) at an origin and extending to an object and calculating the Euclidean norm of the vector. Structure of data used in inferring depths can have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. In some embodiments, for ease of visualization, the processor converts and reports data from which depth is inferred in the format of millimeters or inches of depth; however, this is not a requirement, which is not to suggest that other described features are required. For example, a processor converts pixel intensities from which depth is inferred into meters of depth for ease of visualization, or uses the pixel intensities directly given that the relation between pixel intensity and depth is known. To reduce computational expense, the extra step of converting data from which depth is inferred into a specific format is eliminated, which is not to suggest that any other feature here may not also be omitted in some embodiments. The methods of perceiving or otherwise inferring depths and the formats of reporting depths used herein are for illustrative purposes and are not intended to limit the invention, again which is not to suggest that other descriptions are limiting. Depths can be perceived (e.g., measured or otherwise inferred) in any form and be reported in any format.

In some embodiments, maps are three dimensional maps, e.g., indicating the position of walls, furniture, doors, and the like in an environment being mapped. In some embodiments, maps are two dimensional maps, e.g., point clouds or polygons or finite ordered list indicating obstructions at a given height (or range of height, for instance from zero to 5 or 10 centimeters or less) above the driving surface. In some embodiments, the processor of a vehicle constructs two dimensional maps from two dimensional data or from three dimensional data where data at a given height above the driving surface is used and data pertaining to higher features are discarded. In some embodiments, maps can be encoded in vector graphic formats, bitmap formats, or other formats.

In some embodiments, the processor of the autonomous vehicle uses the constructed map to autonomously navigate the environment during operation, e.g., accessing the map to determine that a candidate route is blocked by an obstacle denoted in the map, to select a route with a route-finding algorithm from a current point to a target point, or the like. In some embodiments, the processor stores the map in memory for future use. Storage of the map can be in temporary memory such that the stored map is only available during an operational session or in more permanent forms of memory such that the map is available at the next session or startup. In some embodiments, the processor further identifies rooms and other segments within the map. In some embodiments, the processor constructs a new map at each use, or updates an extant map based on newly acquired data Some embodiments reference previous maps during subsequent mapping operations. For example, embodiments apply Bayesian techniques to simultaneous localization and mapping and update priors in existing maps based on mapping measurements taken in subsequent sessions. Some embodiments reference previous maps and classify objects in a field of view as being moveable objects upon detecting a difference of greater than a threshold size.

In some embodiments, processors of autonomous vehicles operating within the same environment share their maps with each other using an established DTC link. In some embodiments, the processor of an autonomous vehicles merges two maps using different methods, such as the intersection or union of two maps. For example, in some embodiments, the processor applies the union of two maps to create an extended map of the environment with areas which may have been undiscovered in one of the two maps. In some embodiments, the processor of an autonomous vehicles creates a second map or places an existing (local or remote) map on top of a previously created map in a layered fashion, resulting in additional areas of the environment which may have not been recognized in the original map. Such methods may be used, for example, in cases where areas are separated by movable obstacles that may have prevented sensors of vehicles from determining a portion of the map of the environment. For example, a soft curtain may act as a movable object that appears as a wall in one map. In this case, the processor creates a second map or places a local or remote second map on top of the previously created first map in a layered fashion to add areas to the original map which may have not been previously discovered. The processor of the vehicle then recognizes (e.g., determines) the area behind the curtain that may be important (e.g., warrant adjusting a route based on) in completing an assigned task.

In some embodiments, all data are processed on an autonomous vehicle. In other embodiments, some data are processed on at least one separate device, such as a charging station of the autonomous vehicle or on the cloud.

In some embodiments, the processes, methods, techniques and/or apparatuses described herein are combined with or further include additional processes, methods, techniques and/or apparatuses such as those described in U.S. patent application Ser. Nos. 16/048,179, 16/048,185, 16/163,541, 16/163,562, and 16/163,508, the entire contents of which are hereby incorporated by reference.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships (e.g., "in response to X, Y," "upon X, Y,", "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus specially designed to carry out the stated functionality, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct (e.g., reference to "parallel" surfaces encompasses substantially parallel surfaces). The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. Negative inferences should not be taken from inconsistent use of "(s)" when qualifying items as possibly plural, and items without this designation may also be plural.

The present techniques will be better understood with reference to the following enumerated embodiments:

1. A method for perceiving a spatial model of a working environment comprising: capturing data by one or more sensors of one or more vehicles moving within the working environment, the data being indicative of depth within the working environment from respective sensors of the one or more vehicles to objects in the working environment at a plurality of different sensor poses; obtaining, with one or more processors of at least one of the one or more vehicles moving within the working environment, a plurality of depth images based on the captured data, wherein: respective depth images are based on data captured from different positions of the one or more sensors within the working environment through which the one or more vehicles move, respective depth images comprise a plurality of depth data, the depth data indicating distance from respective sensors to objects within the working environment at respective sensor poses, and depth data of respective depth images correspond to respective fields of view of the one or more sensors of the one or more vehicles; aligning, with the one or more processors of the at least one of the one or more vehicles moving within the working environment, depth data of respective depth images based on one ore more areas of overlap between the fields of view of the plurality of depth images; and determining, with one or more processors of the at least one of the one or more vehicles moving within the working environment, based on alignment of the depth data, the spatial model of the working environment.

2. The method of embodiment 1, wherein: the one ore more areas of overlap are selected based on a confidence level of overlap between depth data of respective depth images.

3. The method of embodiment 2, wherein: depth data of respective depth images with an area of overlap having confidence level of overlap below a threshold value are not aligned.

4. The method of embodiment 1, comprising: storing at least part of the spatial model of the working environment in memory of the at least one of the one or more vehicles moving within the working environment; determining, with the one or more processors of the at least one of the one or more vehicles moving within the working environment, a path of at least one of the one or more vehicles based on the at least part of the spatial model of the working environment; and controlling, with the one or more processors of the at least one of the one or more vehicles moving within the working environment, an actuator of the at least one of the one or more vehicles to cause the at least one of the one or more vehicles to move along the determined path.

5. The method of embodiment 1, wherein: depth data is associated with respective values indicating respective angular displacements of corresponding depths in respective frames of reference corresponding to the respective fields of view; the respective depth images corresponding to a respective vehicle are obtained by triangulating respective object depths based on captured angles at which a laser emitted from the respective vehicle of the one or more vehicles and reflecting off respective objects is received at a camera sensor of the respective vehicle of the one or more vehicles; the plurality of depth data comprises a plurality of depth vectors from the respective sensors to objects within the working environment, respective vectors including at least one coordinate indicating relative position in a respective field of view and at least one coordinate indicating depth.

6. The method of embodiment 1, wherein the one or more sensors comprise at least one imaging sensor and at least one infrared illuminator.

7. The method of embodiment 1, wherein aligning comprises: determining a first area of overlap between a first depth image and a second depth image among the plurality of depth images; and determining a second area of overlap between the second depth image and a third depth image among the plurality of depth images, the first area of overlap being at least partially different from the second area of overlap.

8. The method of embodiment 7, wherein determining at least one of the first area of overlap and the second area of overlap comprises: determining the area of overlap based on Jacobian and Hessian matrices.

9. The method of embodiment 7, wherein determining the first area of overlap comprises: detecting a first edge at a first position in the first image based on a derivative of depth with respect to one or more spatial coordinates of depth data in the first depth image; detecting a second edge at a second position in the first image based on the derivative of depth with respect to one or more spatial coordinates of depth data in the first depth image; detecting a third edge in a third position in the second image based on a derivative of depth with respect to one or more spatial coordinates of depth data in the second depth image; determining that the third edge is not the same edge as the second edge based on shapes of the third edge and the second edge not matching; determining that the third edge is the same edge as the first edge based on shapes of the first edge and the third edge at least partially matching; and determining the first area of overlap based on a difference between the first position and the third position.

10. The method of embodiment 7, wherein determining the first area of overlap comprises: thresholding the first depth image to form a first thresholded depth image; thresholding the second depth image to form a second thresholded depth image; and aligning the first thresholded depth image to the second thresholded depth image.

11. The method of embodiment 7, wherein determining the first area of overlap comprises: determining alignment scores of a plurality of candidate alignments based on a Szymkiewicz-Simpson coefficient of overlap between at least part of the first depth image and at least part of the second depth image; and selecting an alignment from among the candidate alignments based on the alignment scores.

12. The method of embodiment 7, wherein determining the first area of overlap comprises: determining an approximate alignment between a reduced resolution version of the first depth image and a reduced resolution version of the second depth image; and refining the approximate alignment by: determining aggregate amounts of difference between overlapping portions of the first depth image and the second depth image at candidate alignments displaced from the approximate alignment; and selecting a candidate alignment that produces a lowest aggregate amount of difference among the candidate alignments or selecting a candidate alignment that produces an aggregate amount of difference less than a threshold.

13. The method of embodiment 7, wherein determining the first area of overlap comprises: detecting a feature in the first depth image, the first depth image corresponding to a first sensor of the one or more sensors; detecting the feature in the second depth image, the second depth image corresponding to a second sensor of the one or more sensors; determining a first value indicative of a difference in position of the feature in the first and second depth images in a first frame of reference of the first sensor; obtaining a second value indicative of a difference in pose between the first sensor from which the first depth image is obtained and the second sensor from which the second depth image is obtained; and determining the first area of overlap based on the first value and the second value.

14. The method of embodiment 7, wherein determining the first area of overlap comprises: applying a convolution to the first depth image with a kernel function that determines aggregate measures of difference between at least part of the first depth image and at least part of the second depth image based on differences between depths in respective images; and selecting an alignment that the convolution indicates has a smallest aggregate measure of difference.

15. The method of embodiment 7, wherein determining the first area of overlap comprises: obtaining a vector indicative of spatial displacement between a first sensor of the one or more sensors by which the first image is captured and a second sensor of the one or more sensors by which the second image is captured in a frame of reference of the working environment; and transforming frames of reference of the second depth image and the first depth image into the same frame of reference based on the vector.

16. The method of embodiment 7, wherein determining the spatial model of the working environment comprises: determining a point cloud model of the working environment based on alignment of the plurality of depth images.

17. The method of embodiment 7, wherein determining the spatial model of the working environment comprises: determining a two-dimensional bitmap representation of obstacles in the working environment based on alignment of the plurality of depth images.

18. The method of embodiment 7, wherein determining the spatial model of the working environment comprises: updating priors of a Bayesian spatial model of the working environment from a previous mapping by the one or more processors of the at least one of the one or more vehicles.

19. The method of embodiment 7, comprising: simultaneously localizing the at least one of the one or more vehicles and mapping the working environment, wherein the spatial model comprises positions of obstacles in the working environment and values indicating confidence scores for those respective positions, wherein: the confidence scores are based on at least one of the following: quality of the captured data, noise in perceived depth, similarity between depths recorded from different fields of view, or confident scores of =adjacent depths; and determining the spatial model comprises pruning or determining to not add positions of obstacles with a threshold confidence score that fail to satisfy a threshold from, or to, the spatial model.

20. The method of embodiment 1, comprising: steps for constructing at least one floor plan of the working environment.

21. The method of embodiment 1, comprising: executing a task with the at least one of the one or more vehicles based on at least part of the spatial model.

22. A plurality of vehicles, each comprising: an actuator configured to move the respective vehicle through a working environment; one or more mechanically coupled sensors; one or more processors configured to send and receive sensed data from the one or more sensors of the plurality of vehicles and control the respective vehicle's actuator; and memory storing instructions that when executed by at least some of the processors of each vehicle effectuate operations comprising: capturing data by the one or more sensors of the respective vehicle moving within the working environment, the data being indicative of depth within the working environment from respective sensors of the vehicle to objects in the working environment at a plurality of different sensor poses; obtaining a plurality of depth images based on the data captured by the one or more sensors of the plurality of vehicles moving within the environment, wherein: respective depth images are based on data captured from different positions within the working environment through which each of the plurality of vehicles moves, respective depth images comprise a plurality of depth data, the depth data indicating distance from respective sensors to objects within the working environment at respective sensor poses, and depth data of respective depth images correspond to respective fields of view; aligning depth data of respective depth images based on one or more areas of overlap between the fields of view of the plurality of depth images; and determining, based on alignment of the depth data, a spatial model of the working environment.

23. A method for constructing a floor plan using a plurality of cameras configured to move within a working environment, the method comprising: perceiving depths from one or more of the plurality of cameras to objects within a respective field of view, such that a depth is recorded for specified angles within each of the one or more respective fields of view; obtaining, with one or more processors of one or more of the plurality of cameras, at least a portion of the depths perceived by the one or more plurality of cameras; comparing, with the one or more processors of the one or more of the plurality of cameras, at least a portion of depths perceived by the one or more plurality of cameras; identifying, with the one or more processors of the one or more of the plurality of cameras, one or more areas of overlap between the depths perceived by the one or more plurality of cameras when a number of consecutive depths from different fields of view are similar to a specified tolerance range; and combining depths from the different fields of view at the identified area of overlap to generate combined fields of view.

24. The method of embodiment 23, wherein: the combined fields of view represent a portion of the floor plan; steps of the method are repeated such that the objects within a working environment are plotted by the combination of depths from consecutively overlapping fields of view; and a camera of the plurality of cameras is configured to move within the working environment such that consecutive fields of view overlap.

25. The method of embodiment 23, further comprising calculating an adjustment range based on expected noise, wherein: the adjustment range is applied with respect to a first set of depths; the adjustment range comprises a range within which an overlapping second set of depths are expected to fall.

26. The method of embodiment 23, further comprising assigning a weight to each depth based on accuracy of the depth, wherein a depth falling within the adjustment range increases the weight and a depth falling outside the adjustment range decreases the weight or vice versa and depths with higher weight are assigned a more accurate rating or vice versa.

27. The method of embodiment 26, wherein: similarities between depths recorded from separate fields of view affect the weight of the depth; the weight of a respective depth is affected by the weight of other depths within a threshold depth of the respective depth; the weight corresponding to a depth changes with each depth taken within each field of view; the weight of the depths within an area of overlap increases with increasing area of overlap; where the weight of depths increases with the number of sets of depths overlapping with the depths; and depths with weight less than a threshold amount are excluded from at least some operations.

28. The method of embodiment 23, wherein the overlapping area is expanded relative to an initially determined overlapping area to include depths spatially positioned before and after the identified overlapping area.

29. The method of embodiment 23, wherein: combining depths from different fields of view at the identified area of overlap further comprises estimating depths for the area of overlap; and depths from the one or more areas of overlap are estimated using the overlapping depths taken from the different fields of view and a mathematical model.

30. The method of embodiment 23, wherein the plurality of cameras comprises at least one of a depth camera or a 360-degree LIDAR (light detection and ranging) system.

The invention claimed is:
1. A method for perceiving a spatial model of a working environment comprising:
  capturing data by one or more sensors of one or more vehicles moving within the working environment, the data being indicative of depth within the working environment from the one or more sensors of the one or more vehicles to objects in the working environment at a plurality of different sensor poses;
  obtaining, with one or more processors of at least one of the one or more vehicles moving within the working environment, a plurality of depth images based on the captured data, wherein:
    the plurality of depth images correspond to respective fields of view of the one or more sensors of the one or more vehicles;
  aligning, with the one or more processors of the at least one of the one or more vehicles moving within the working environment, the plurality of depth images with each other based on one or more areas of overlap between the fields of view of the plurality of depth images, wherein aligning comprises:
    determining a first area of overlap between a first depth image and a second depth image among the plurality of depth images, comprising:
      detecting a first edge at a first position in the first image based on a derivative of depth with respect to one or more spatial coordinates of depth data in the first depth image;
      detecting a second edge at a second position in the first image based on the derivative of depth with respect to one or more spatial coordinates of depth data in the first depth image;
      detecting a third edge in a third position in the second image based on a derivative of depth with respect to one or more spatial coordinates of depth data in the second depth image; and
      determining that the third edge is not the same edge as the second edge based on shapes of the third edge and the second edge not matching;
      determining that the third edge is the same edge as the first edge based on shapes of the first edge and the third edge at least partially matching; and
      determining the first area of overlap based on a difference between the first position and the third position; and
    determining a second area of overlap between the second depth image and a third depth image among the plurality of depth images, the first area of overlap being at least partially different from the second area of overlap; and
  perceiving, with the one or more processors of the at least one of the one or more vehicles moving within the working environment, based on alignment of the depth data, the spatial model of the working environment.

2. The method of claim 1, wherein:
the one or more processor selects the one or more areas of overlap between the fields of view of the plurality of depth images based on a confidence level of overlap between depth data of respective depth images.

3. The method of claim 2, wherein:
two or more depth images of the plurality of depth images with an area of overlap having the confidence level of overlap below a threshold value are not aligned with each other.

4. The method of claim 1, comprising:
storing at least part of the spatial model of the working environment in memory of the at least one of the one or more vehicles moving within the working environment;
determining, with the one or more processors of the at least one of the one or more vehicles moving within the working environment, a path of at least one of the one or more vehicles based on the at least part of the spatial model of the working environment; and
controlling, with the one or more processors of the at least one of the one or more vehicles moving within the working environment, an actuator of the at least one of the one or more vehicles to cause the at least one of the one or more vehicles to move along the determined path.

5. The method of claim 1, wherein:
each depth image of the plurality of depth images is associated with a value indicating angular displacements of each depth image relative to a depth image of the plurality of depth images captured immediately before;
the plurality of depth images are obtained by triangulating object depths based on captured angles at which a one or more lasers mounted on the plurality of vehicles emitted and reflecting off the objects is received at one or more camera sensors of the plurality of vehicles; and
the plurality of depth images comprises a plurality of depth vectors from the one or more sensors to the objects within the working environment, the plurality of vectors including at least one coordinate indicating positions of the objects in the respective field of views and at least one coordinate indicating the object depths in the respective field of views.

6. The method of claim 1, wherein the one or more sensors comprise at least one imaging sensor and at least one infrared illuminator.

7. The method of claim 1, wherein determining the second area of overlap comprises:
determining the area of overlap based on Jacobian and Hessian matrices.

8. The method of claim 1, wherein determining the second area of overlap comprises:
detecting a first edge at a first position in the first image based on a derivative of depth with respect to one or more spatial coordinates of depth data in the first depth image;
detecting a second edge at a second position in the first image based on the derivative of depth with respect to one or more spatial coordinates of depth data in the first depth image;
detecting a third edge in a third position in the second image based on a derivative of depth with respect to one or more spatial coordinates of depth data in the second depth image; and
determining that the third edge is not the same edge as the second edge based on shapes of the third edge and the second edge not matching;
determining that the third edge is the same edge as the first edge based on shapes of the first edge and the third edge at least partially matching; and
determining the first area of overlap based on a difference between the first position and the third position.

9. The method of claim 1, wherein determining the second area of overlap comprises:
thresholding the first depth image to form a first thresholded depth image;
thresholding the second depth image to form a second thresholded depth image; and
aligning the first thresholded depth image to the second thresholded depth image.

10. The method of claim 1, wherein determining the second area of overlap comprises:
determining alignment scores of a plurality of candidate alignments based on a Szymkiewicz-Simpson coefficient of overlap between at least part of the first depth image and at least part of the second depth image; and
selecting an alignment from among the candidate alignments based on the alignment scores.

11. The method of claim 1, wherein determining the second area of overlap comprises:
determining an approximate alignment between a reduced resolution version of the first depth image and a reduced resolution version of the second depth image; and
refining the approximate alignment by:
determining aggregate amounts of difference between overlapping portions of the first depth image and the second depth image at candidate alignments displaced from the approximate alignment; and
selecting a candidate alignment that produces a lowest aggregate amount of difference among the candidate alignments or selecting a candidate alignment that produces an aggregate amount of difference less than a threshold.

12. The method of claim 1, wherein determining the second area of overlap comprises:
detecting a feature in the first depth image, the first depth image corresponding to a first sensor of the one or more sensors;
detecting the feature in the second depth image, the second depth image corresponding to a second sensor of the one or more sensors;
determining a first value indicative of a difference in position of the feature in the first and second depth images in a first frame of reference of the first sensor;
obtaining a second value indicative of a difference in pose between the first sensor from which the first depth image is obtained and the second sensor from which the second depth image is obtained; and
determining the first area of overlap based on the first value and the second value.

13. The method of claim 1, wherein determining the second area of overlap comprises:
applying a convolution to the first depth image with a kernel function that determines aggregate measures of difference between at least part of the first depth image and at least part of the second depth image based on differences between depths in respective images; and
selecting an alignment that the convolution indicates has a smallest aggregate measure of difference.

14. The method of claim 1, wherein determining the second area of overlap comprises:
obtaining a vector indicative of spatial displacement between a first sensor of the one or more sensors by which the first image is captured and a second sensor of the one or more sensors by which the second image is captured in a frame of reference of the working environment; and
transforming frames of reference of the second depth image and the first depth image into the same frame of reference based on the vector.

15. The method of claim 1, wherein perceiving the spatial model of the working environment comprises:
determining a point cloud model of the working environment based on alignment of the plurality of depth images.

16. The method of claim 1, wherein perceiving the spatial model of the working environment comprises:
determining a two-dimensional bitmap representation of obstacles in the working environment based on alignment of the plurality of depth images.

17. The method of claim 1, wherein perceiving the spatial model of the working environment comprises:
updating priors of a Bayesian spatial model of the working environment from a previous mapping by the one or more processors of the at least one of the one or more vehicles.

18. The method of claim 1, comprising:
simultaneously localizing the at least one of the one or more vehicles and mapping the working environment, wherein the spatial model comprises positions of obstacles in the working environment and values indicating confidence scores for those respective positions, wherein:
the confidence scores are based on at least one of the following:
quality of the captured data,
noise in perceived depth,
similarity between depths recorded from different fields of view, or
confident scores of adjacent depths; and
perceiving the spatial model comprises pruning or determining to not add positions of obstacles with a threshold confidence score that fail to satisfy a threshold from, or to, the spatial model.

19. The method of claim 1, comprising:
steps for constructing at least one floor plan of the working environment.

20. The method of claim 1, comprising:
executing a task with the at least one of the one or more vehicles based on at least part of the spatial model.

21. A plurality of vehicles, each comprising:
one or more actuators configured to move each vehicle of the plurality of vehicles through a working environment;
one or more sensors mechanically coupled to the plurality of vehicles;
one or more processors configured to send and receive sensed data from the one or more sensors of the plurality of vehicles and control the respective vehicle's actuator; and
memory storing instructions that when executed by the one or more processors of each vehicle effectuate operations comprising:
  capturing data by the one or more sensors of the plurality of vehicles moving within the working environment, the data being indicative of depth within the working environment from the one or more sensors of the plurality of vehicles to objects in the working environment at a plurality of different sensor poses;
  obtaining a plurality of depth images based on the data captured by the one or more sensors of the plurality of vehicles moving within the environment, wherein:
    depth data of respective depth images correspond to respective fields of view;
  aligning the plurality of depth images with each other based on one or more areas of overlap between the fields of view of the plurality of depth images, wherein aligning comprises:
    determining a first area of overlap between a first depth image and a second depth image among the plurality of depth images, comprising:
      determining an approximate alignment between a reduced resolution version of the first depth image and a reduced resolution version of the second depth image; and
      refining the approximate alignment by:
        determining aggregate amounts of difference between overlapping portions of the first depth image and the second depth image at candidate alignments displaced from the approximate alignment; and
        selecting a candidate alignment that produces a lowest aggregate amount of difference among the candidate alignments or selecting a candidate alignment that produces an aggregate amount of difference less than a threshold; and
    determining a second area of overlap between the second depth image and a third depth image among the plurality of depth images, the first area of overlap being at least partially different from the second area of overlap; and
  determining, based on alignment of the plurality of depth images with each other, a spatial model of the working environment.

22. The plurality of vehicles of claim 21, wherein the operations further comprise:
storing at least part of the spatial model of the working environment in memory of each of the plurality of vehicles moving within the working environment;
determining, with the one or more processors, a path of each of the plurality of vehicles based on the at least part of the spatial model of the working environment;
controlling, with the one or more processors, an actuator of each of the plurality of vehicles to cause the plurality of vehicles to move along their determined paths.

\* \* \* \* \*